(12) United States Patent
Winnicka et al.

(10) Patent No.: US 10,335,880 B2
(45) Date of Patent: Jul. 2, 2019

(54) RACKS FOR HIGH-TEMPERATURE METAL PROCESSING

(71) Applicants: Maria Bozena Winnicka, Euclid, OH (US); Scott Jeffrey Volchko, Hinckley, OH (US); Stan Wojciechowski, Kirtland, OH (US); Abhishek Bhattacharyya, Newton, MA (US)

(72) Inventors: Maria Bozena Winnicka, Euclid, OH (US); Scott Jeffrey Volchko, Hinckley, OH (US); Stan Wojciechowski, Kirtland, OH (US); Abhishek Bhattacharyya, Newton, MA (US)

(73) Assignee: H.C. STARCK INC., Newton, MA (US)

( * ) Notice: Subject to any disclaimer, the term of this patent is extended or adjusted under 35 U.S.C. 154(b) by 591 days.

(21) Appl. No.: 15/045,791

(22) Filed: Feb. 17, 2016

(65) Prior Publication Data

US 2016/0236305 A1    Aug. 18, 2016

Related U.S. Application Data

(60) Provisional application No. 62/117,192, filed on Feb. 17, 2015.

(51) Int. Cl.
*B23K 1/00* (2006.01)
*B23K 1/008* (2006.01)
*F27D 5/00* (2006.01)
*A47B 87/02* (2006.01)

(52) U.S. Cl.
CPC .......... *B23K 1/008* (2013.01); *A47B 87/0223* (2013.01); *F27D 5/0006* (2013.01)

(58) Field of Classification Search
CPC . A47B 87/0223; A47B 47/045; A47B 13/003; A47B 57/10; F16B 12/50; F16B 12/14; B23K 3/087
See application file for complete search history.

(56) References Cited

U.S. PATENT DOCUMENTS

| | | |
|---|---|---|
| 3,739,921 A | 6/1973 | Schmidt |
| 4,227,874 A | 10/1980 | Nugent |
| 4,815,971 A | 3/1989 | Bucher |
| 5,881,653 A | 3/1999 | Pfister |
| 7,384,267 B1 | 6/2008 | Ego |
| 8,133,049 B1 | 3/2012 | Sullivan et al. |
| 2005/0109816 A1* | 5/2005 | Swartzbeck ....... B23K 37/0435 228/44.3 |

(Continued)

FOREIGN PATENT DOCUMENTS

| | | |
|---|---|---|
| JP | 07-012472 A | 1/1995 |
| JP | 09257025 A * | 9/1997 |

OTHER PUBLICATIONS

JP-09257025-A computer english translation (Year: 1997).*

(Continued)

*Primary Examiner* — Erin B Saad
(74) *Attorney, Agent, or Firm* — Morgan, Lewis & Bockius LLP

(57) ABSTRACT

In various embodiments, apparatuses for receiving and supporting one or more components during processing thereof at process temperatures greater than approximately 1000° C. feature refractory metal shelves separated by refractory metal support posts.

26 Claims, 21 Drawing Sheets

(56) References Cited

U.S. PATENT DOCUMENTS

2005/0188902 A1    9/2005  Savoie
2013/0256386 A1*  10/2013  Schacht .............. B23K 1/0018
                                                228/44.3

OTHER PUBLICATIONS

International Search Report and Written Opinion issued in a corresponding International Application No. PCT/US2016/018238 dated Jun. 27, 2016.

* cited by examiner

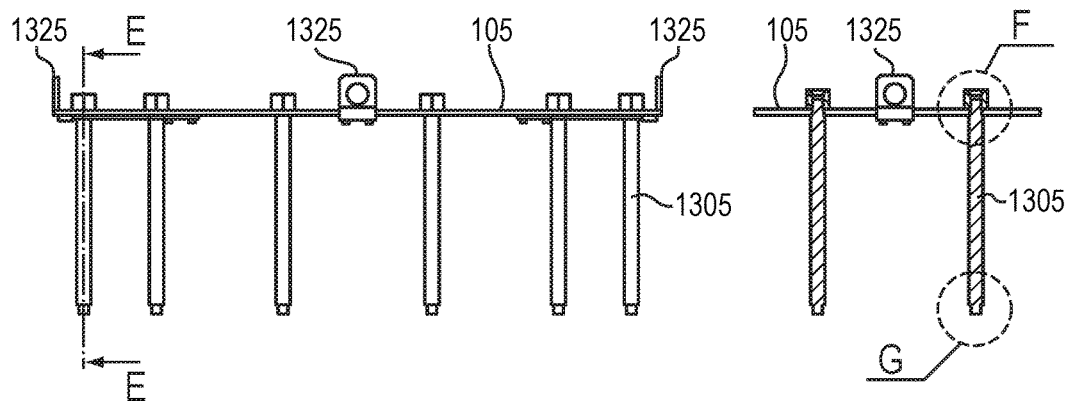
FIG. 13C
FIG. 13D
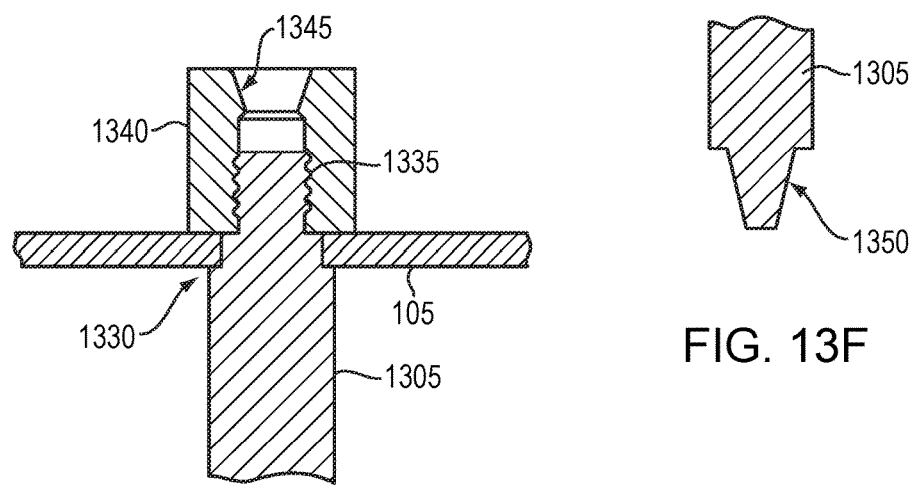
FIG. 13E
FIG. 13F

RACKS FOR HIGH-TEMPERATURE METAL PROCESSING

RELATED APPLICATION

This application claims the benefit of and priority to U.S. Provisional Patent Application No. 62/117,192, filed Feb. 17, 2015, the entire disclosure of which is hereby incorporated herein by reference.

TECHNICAL FIELD

In various embodiments, the present invention relates to support structures for high-temperature processing.

BACKGROUND

While high-temperature metal fabrication and joining processes are used in many different industries and to generate a host of different metallic parts, the extreme temperatures of such processes place many demands on the processing spaces and support structures utilized during processing. The joining of metal parts via high-temperature brazing (i.e., the joining of materials via a joint composed of a brazing material) is one such example, as the support structure on which the parts rest during processing must be able to tolerate vacuum or reducing ambients and extreme temperatures (e.g., greater than 1000° C.) without deformation or failure.

Conventional support structures for brazing processes include rack-like structures fastened together via welding or riveting, but such structures are typically unsuited for the extreme environments utilized in high-temperature brazing processes. Specifically, the materials of which such structures are composed may deform or fail when supporting heavy loads (i.e., the parts being brazed, which may weigh hundreds of kilograms or more) at extreme temperatures. Conventional support structures may deform under such conditions by, e.g., creep, and disturb the parts being brazed or even fail entirely, resulting in economic loss and reduced productivity. Thus, there is a need for improved structures capable of supporting heavy loads during high-temperature processes without deformation, failure, or reaction with processing ambients or metallic parts being processed.

SUMMARY

In accordance with various embodiments of the present invention, support racks for high-temperature processing (e.g., brazing, dewaxing, or the like) are formed of a series of plates (or "shelves") supported and separated from each other by threaded posts incorporating support collars for improved stability. In various embodiments, the bottom end of the post is threaded and engages with a complementarily threaded hole in the shelf below, while the top end of the post includes a support collar for supporting the shelf above. In various other embodiments, the upper end of the post is threaded and incorporates a support collar. In such embodiments, the upper threaded end engages with a complementarily threaded nut featuring a tapered recess defined by the upper surface thereof. This recess receives the lower end of the post, which is tapered to snugly fit within the nut recess. Since in some embodiments a set of posts is only threadingly fastened to one shelf (either the shelf above or below the posts), one or more of the shelves may include one or more (and preferably two or more, e.g., four) "lift hooks" enabling the modularized movement, assembly, or disassembly of the full rack one module (i.e., a shelf with all associated posts) at a time, depending upon the demands of a particular high-temperature process. In various embodiments, the rack may also incorporate one or more support layers on which the various shelves and posts are disposed. The support layer(s) may include or consist essentially of a series of bars or braces that support the weight of the rack while reducing the amount of areal contact between the bottom surface of the rack and the high-temperature furnace (or other processing equipment) compared to an embodiment in which one of the shelves themselves were to rest directly upon the furnace surface.

One or more of the parts of the racks include, consist essentially of, or consist of one or more refractory materials (e.g., refractory metals) having melting points higher than the temperatures utilized for high-temperature brazing processes (e.g., 1000° C.-1100° C.). In various embodiments, one or more of the rack parts include, consist essentially of, or consist of one or more TZM alloys (i.e., alloys of titanium (Ti), zirconium (Zr), and molybdenum (Mo), with optional additions of carbon (C)), as such alloys exhibit superior resistance to creep when supporting heavy loads at extreme temperatures (e.g., 1000° C.-1400° C.) and thus resist deformation (and resulting failure) at such temperatures. In various other embodiments, one or more of the rack parts include, consist essentially of, or consist of one or more refractory metals, e.g., niobium (Nb), tantalum (Ta), rhenium (Re), tungsten (W), and/or Mo. In various embodiments, one or more of the rack parts incorporate one or more alloying elements, for example lanthanum (La), at concentrations of, e.g., approximately 0.01% to approximately 1%.

In various embodiments of the invention, the shelves of the rack are perforated (i.e., a series of apertures is defined therethrough) in order to allow gas to flow through the shelves during processing. Such gases may include, for example, the by-products of out-gassing of the parts or the brazing material during processing, or process gases (e.g., hydrogen and/or another appropriate process gas) utilized to generate a desired processing atmosphere (e.g., a reducing atmosphere), i.e., the processing "ambient." While racks in accordance with embodiments of the present invention may include any number of shelves, typical implementations include two, three, or even more shelves with the aforementioned threaded posts disposed therebetween and supporting the layered shelves. In various embodiments, the support post upon which the top shelf rests is configured to penetrate through the top shelf. This protruding section of the upper support post may define a lateral aperture through which a locking pin may be disposed to lock the upper shelf in place. In various embodiments, the locking pin is held in place by one or more retaining wires. Alternatively, a threaded cap or nut may also be used to lock the upper shelf in place.

In an aspect, embodiments of the invention feature an apparatus for receiving and supporting one or more components during processing thereof at a process temperature greater than approximately 1000° C. The apparatus includes or consists essentially of a first shelf, a plurality of first support posts, and a second shelf. The first shelf includes, consists essentially of, or consists of a first refractory metal having a melting point greater than the process temperature. The first shelf defines therein or therethrough a plurality of apertures, each aperture being threaded through at least a portion of its thickness. One or more of the first support posts includes, consists essentially of, or consists of a second refractory metal having a melting point greater than the process temperature. One or more of the first support posts has a threaded lower end for engagement with a threaded aperture of the first shelf. One or more of the first support posts defines a support collar proximate an upper end opposite the threaded lower end. A lateral dimension (e.g., a width or diameter) of the first support post above the support collar is smaller than a lateral dimension (e.g., a width or diameter) of the first support post below the support collar. The second shelf includes, consists essentially of, or consists of a third refractory metal having a melting point greater than the process temperature. The second shelf defines therein or therethrough a plurality of apertures. One or more apertures of the second shelf receives and/or is configured to receive the upper end of one of the lower support posts such that a portion of the second shelf proximate each aperture thereof rests upon the support collar of the first support post received in the aperture.

Embodiments of the invention may include one or more of the following in any of a variety of combinations. One or more of the components may be a metallic part. The apparatus may resist creep deformation at the process temperature. The first, second, and/or third refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The first, second, and/or third refractory metals may include, consist essentially of, or consist of Nb, Ta, Re, W, and/or Mo. The first shelf and/or the second shelf may define a plurality of perforations therethrough. The threaded lower end of each of the first support posts may include a support shoulder defined therein. The apparatus may include a third shelf and a plurality of second support posts. The third shelf may include, consist essentially of, or consist of a fourth refractory metal having a melting point greater than the process temperature. The third shelf may define therein or therethrough a plurality of apertures. One or more of the second support posts may include, consist essentially of, or consist of a fifth refractory metal having a melting point greater than the process temperature. One or more of the second support posts may have a threaded lower end for engagement with a threaded aperture. One or more of the second support posts may define a support collar proximate an upper end opposite the threaded lower end. A lateral dimension (e.g., a width or diameter) of the second support post above the support collar may be smaller than a lateral dimension (e.g., a width or diameter) of the second support post below the support collar. One or more of the second support posts may define a dowel pin mount through the upper end thereof above the support collar. The upper end of one or more of the second support posts is receivable and/or received within an aperture of the third shelf such that (i) a portion of the third shelf proximate each aperture thereof rests upon the support collar of the second support post received in the aperture, and (ii) the dowel pin mount of the second support post is disposed above a top surface of the third shelf. The fourth and/or fifth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo.

The threaded lower end of one or more of the second support posts may include a support shoulder defined therein. The third shelf may define a plurality of perforations therethrough. The apparatus may include a plurality of locking pins. One or more of the locking pins may include, consist essentially of, or consist of a sixth refractory metal having a melting point greater than the process temperature. One or more of the locking pins may be receivable and/or received within a dowel pin mount of a second support post, thereby preventing disengagement of the second support posts from the third shelf. The sixth refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo. One or more of the locking pins may define one or more apertures therethrough.

The apparatus may include a plurality of retaining wires. One or more of the retaining wires may include, consist essentially of, or consist of a seventh refractory metal having a melting point greater than the process temperature. One or more of the retaining wires may be receivable and/or received within an aperture of a locking pin, thereby preventing disengagement of the locking pin from the second support post in which it is received or receivable. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys). The threaded lower end of each second support post may be engaged with and/or receivable within a threaded aperture in the second shelf. The apparatus may include one or more additional shelves disposed between the second shelf and the third shelf. One or more of the additional shelves may define a plurality of perforations therethrough.

The first shelf may define a central aperture therethrough. The central aperture may have the shape of a square, rectangle, or circle. The apparatus may include a shelf support disposed below the first shelf. The shelf support may include or consist essentially of a plurality of interconnected cross braces. One or more of the cross braces may include, consist essentially of, or consist of a fourth refractory metal having a melting point greater than the process temperature. The apparatus may include a first support tube. The first support tube may have a lower end for extending through the central aperture of the first shelf. The lower end of the first support tube may define a plurality of notches. One or more of the notches may be configured to receive therein one of the cross braces of the shelf support. The first support tube may include, consist essentially of, or consist of a fifth refractory metal having a melting point greater than the process temperature. The fourth and/or fifth refractory metals may include, consist essentially of, or consist of a TZM alloy The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo. The first support tube may have an upper end opposite the lower end. The upper end of the first support tube may define therein a plurality of notches. The apparatus may include a first support brace including or consisting essentially of a plurality of appendages for supporting the second shelf thereon. One or more of the appendages may be configured for receipt into one of the notches of the upper end of the first support tube. The appendages of the support brace may define a cross shape. The second shelf may define a central aperture therethrough. The central aperture may have the shape of a square, rectangle, or circle. The apparatus may include a second support tube. The second support tube may have a lower end for extending through the central aperture of the second shelf. The lower end of the second support tube may define a plurality of notches. One or more of the notches may be configured to receive therein one of the appendages of the support brace. The second support tube may include, consist essentially of, or consist of a sixth refractory metal having a melting point greater than the process temperature. The second support tube may have an upper end opposite the lower end. The upper end of the second support tube may define therein a plurality of notches. The sixth refractory metal may include, consist essentially of, or consist of a TZM alloy The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo. The apparatus may include a base disposed beneath the shelf support. The base may include or consist essentially of (i) a plurality of spaced-apart cross bars each defining a plurality of apertures therethrough, and (ii) a plurality of spaced-apart through rods each extending through the apertures of multiple ones of the cross bars. The base may include one or more alignment features (e.g., posts, brackets, plates, etc.) extending upward therefrom. The shelf support may include one or more brackets each for receiving one of the one or more alignment features.

The apparatus may include a base disposed beneath the first shelf. The base may include or consist essentially of (i) a plurality of spaced-apart cross bars each defining a plurality of apertures therethrough, and (ii) a plurality of spaced-apart through rods each extending through the apertures of multiple ones of the cross bars. One or more of the cross bars may include, consist essentially of, or consist of a fourth refractory metal having a melting point greater than the process temperature. One or more of the through rods may include, consist essentially of, or consist of a fifth refractory metal having a melting point greater than the process temperature. The fourth and/or fifth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo. The apparatus may include a shelf support disposed below the first shelf and/or disposed above the base. The shelf support may include or consist essentially of a plurality of interconnected cross braces. One or more of the cross braces metals may include, consist essentially of, or consist of a sixth refractory metal having a melting point greater than the process temperature. The base may include one or more alignment features (e.g., posts, brackets, plates, etc.) extending upward therefrom. The shelf support may include one or more brackets each for receiving one of the one or more alignment features. The sixth refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo.

In another aspect, embodiments of the invention feature a method of high-temperature brazing at a process temperature greater than approximately 1000° C. An apparatus is disposed within a furnace chamber. The apparatus includes or consists essentially of a first shelf, a plurality of first support posts, and a second shelf. The first shelf includes, consists essentially of, or consists of a first refractory metal having a melting point greater than the process temperature. The first shelf defines therein or therethrough a plurality of apertures, each aperture being threaded through at least a portion of its thickness. One or more of the first support posts includes, consists essentially of, or consists of a second refractory metal having a melting point greater than the process temperature. One or more of the first support posts has a threaded lower end for engagement with a threaded aperture of the first shelf. One or more of the first support posts defines a support collar proximate an upper end opposite the threaded lower end. A lateral dimension (e.g., a width or diameter) of the first support post above the support collar is smaller than a lateral dimension (e.g., a width or diameter) of the first support post below the support collar. The second shelf includes, consists essentially of, or consists of a third refractory metal having a melting point greater than the process temperature. The second shelf defines therein or therethrough a plurality of apertures. One or more apertures of the second shelf receives and/or is configured to receive the upper end of one of the lower support posts such that a portion of the second shelf proximate each aperture thereof rests upon the support collar of the first support post received in the aperture. On the first shelf and/or the second shelf of the apparatus are disposed (i) a first component, (ii) a second component, and (iii) a brazing material disposed between the first and second components. The brazing material may be in direct contact with the first and second components. A processing ambient is introduced within the furnace chamber. The process temperature is applied within the furnace chamber, thereby melting the brazing material and joining the first and second components at a brazed joint therebetween.

Embodiments of the invention may include one or more of the following in any of a variety of combinations. The first and/or second components may include, consist essentially of, or consist of a metallic part. The apparatus may resist creep deformation at the process temperature. Introducing the processing ambient may include or consist essentially of at least partially evacuating the furnace chamber (i.e., introducing a vacuum therein). Introducing the processing ambient may include or consist essentially of introducing a process gas within the furnace chamber. The process gas may include, consist essentially of, or consist of hydrogen. The first, second, and/or third refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The first, second, and/or third refractory metals may include, consist essentially of, or consist of Nb, Ta, Re, W, and/or Mo. The first shelf and/or the second shelf may define a plurality of perforations therethrough. The threaded lower end of each of the first support posts may include a support shoulder defined therein. The apparatus may include a third shelf and a plurality of second support posts. The third shelf may include, consist essentially of, or consist of a fourth refractory metal having a melting point greater than the process temperature. The third shelf may define therein or therethrough a plurality of apertures. One or more of the second support posts may include, consist essentially of, or consist of a fifth refractory metal having a melting point greater than the process temperature. One or more of the second support posts may have a threaded lower end for engagement with a threaded aperture. One or more of the second support posts may define a support collar proximate an upper end opposite the threaded lower end. A lateral dimension (e.g., a width or diameter) of the second support post above the support collar may be smaller than a lateral dimension (e.g., a width or diameter) of the second support post below the support collar. One or more of the second support posts may define a dowel pin mount through the upper end thereof above the support collar. The upper end of one or more of the second support posts is receivable and/or received within an aperture of the third shelf such that (i) a portion of the third shelf proximate each aperture thereof rests upon the support collar of the second support post received in the aperture, and (ii) the dowel pin mount of the second support post is disposed above a top surface of the third shelf. The fourth and/or fifth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo.

The threaded lower end of one or more of the second support posts may include a support shoulder defined therein. The third shelf may define a plurality of perforations therethrough. The apparatus may include a plurality of locking pins. One or more of the locking pins may include, consist essentially of, or consist of a sixth refractory metal having a melting point greater than the process temperature. One or more of the locking pins may be receivable and/or received within a dowel pin mount of a second support post, thereby preventing disengagement of the second support posts from the third shelf. The sixth refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo. One or more of the locking pins may define one or more apertures therethrough.

The apparatus may include a plurality of retaining wires. One or more of the retaining wires may include, consist essentially of, or consist of a seventh refractory metal having a melting point greater than the process temperature. One or more of the retaining wires may be receivable and/or received within an aperture of a locking pin, thereby preventing disengagement of the locking pin from the second support post in which it is received or receivable. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys). The threaded lower end of each second support post may be engaged with and/or receivable within a threaded aperture in the second shelf. The apparatus may include one or more additional shelves disposed between the second shelf and the third shelf. One or more of the additional shelves may define a plurality of perforations therethrough.

The first shelf may define a central aperture therethrough. The central aperture may have the shape of a square, rectangle, or circle. The apparatus may include a shelf support disposed below the first shelf. The shelf support may include or consist essentially of a plurality of interconnected cross braces. One or more of the cross braces may include, consist essentially of, or consist of a fourth refractory metal having a melting point greater than the process temperature. The apparatus may include a first support tube. The first support tube may have a lower end for extending through the central aperture of the first shelf. The lower end of the first support tube may define a plurality of notches. One or more of the notches may be configured to receive therein one of the cross braces of the shelf support. The first support tube may include, consist essentially of, or consist of a fifth refractory metal having a melting point greater than the process temperature. The fourth and/or fifth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo. The first support tube may have an upper end opposite the lower end. The upper end of the first support tube may define therein a plurality of notches. The apparatus may include a first support brace including or consisting essentially of a plurality of appendages for supporting the second shelf thereon. One or more of the appendages may be configured for receipt into one of the notches of the upper end of the first support tube. The appendages of the support brace may define a cross shape. The second shelf may define a central aperture therethrough. The central aperture may have the shape of a square, rectangle, or circle. The apparatus may include a second support tube. The second support tube may have a lower end for extending through the central aperture of the second shelf. The lower end of the second support tube may define a plurality of notches. One or more of the notches may be configured to receive therein one of the appendages of the support brace. The second support tube may include, consist essentially of, or consist of a sixth refractory metal having a melting point greater than the process temperature. The second support tube may have an upper end opposite the lower end. The upper end of the second support tube may define therein a plurality of notches. The sixth refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo. The apparatus may include a base disposed beneath the shelf support. The base may include or consist essentially of (i) a plurality of spaced-apart cross bars each defining a plurality of apertures therethrough, and (ii) a plurality of spaced-apart through rods each extending through the apertures of multiple ones of the cross bars. The base may include one or more alignment features (e.g., posts, brackets, plates, etc.) extending upward therefrom. The shelf support may include one or more brackets each for receiving one of the one or more alignment features.

The apparatus may include a base disposed beneath the first shelf. The base may include or consist essentially of (i) a plurality of spaced-apart cross bars each defining a plurality of apertures therethrough, and (ii) a plurality of spaced-apart through rods each extending through the apertures of multiple ones of the cross bars. One or more of the cross bars may include, consist essentially of, or consist of a fourth refractory metal having a melting point greater than the process temperature. One or more of the through rods may include, consist essentially of, or consist of a fifth refractory metal having a melting point greater than the process temperature. The fourth and/or fifth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fourth and/or fifth refractory metals may include, consist essentially of, or consist of Nb, Ta, Re, W, and/or Mo. The apparatus may include a shelf support disposed below the first shelf and/or disposed above the base. The shelf support may include or consist essentially of a plurality of interconnected cross braces. One or more of the cross braces metals may include, consist essentially of, or consist of a sixth refractory metal having a melting point greater than the process temperature. The base may include one or more alignment features (e.g., posts, brackets, plates, etc.) extending upward therefrom. The shelf support may include one or more brackets each for receiving one of the one or more alignment features. The sixth refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The sixth refractory metal may include, consist essentially of, or consist of Nb, Ta, Re, W, and/or Mo.

In yet another aspect, embodiments of the invention feature an apparatus for receiving and supporting one or more components during processing thereof at a process temperature greater than approximately 1000° C. The apparatus includes or consists essentially of a first shelf, a second shelf disposed over the first shelf, a plurality of first support posts, and a plurality of first nuts. The first shelf includes, consists essentially of, or consists of a first refractory metal having a melting point greater than the process temperature. The first shelf defines therein or therethrough a plurality of apertures. The second shelf includes, consists essentially of, or consists of a second refractory metal having a melting point greater than the process temperature. The second shelf defines therein or therethrough a plurality of apertures. The second shelf includes one or more first lift hooks extending therefrom. The one or more first lift hooks may extend from a top surface and/or a perimeter of the second shelf. The first shelf may include one or more lift hooks extending therefrom. One or more of the first support posts includes, consists essentially of, or consists of a third refractory metal having a melting point greater than the process temperature. One or more of the first support posts has a tapered lower end for engagement with an aperture of the first shelf. One or more of the first support posts has a threaded upper end opposite the lower end. One or more of the first support posts defines a support collar proximate the upper end. A lateral dimension (e.g., a width or diameter) of the first support post above the support collar is smaller than a lateral dimension (e.g., a width or diameter) of the first support post below the support collar. When an upper end of a first support post is received in an aperture of the second shelf, a portion of the second shelf proximate the aperture rests upon the support collar of the first support post received in the aperture. When an upper end of a first support post is received in an aperture of the second shelf, at least a portion of the upper end of the first support post may extend above a top surface of the second shelf. One or more of the first nuts includes, consists essentially of, or consists of a fourth refractory metal having a melting point greater than the process temperature. One or more of the first nuts defines therein a lower aperture. At least a portion of the lower aperture may be threaded for engagement with an upper end of a first support post. One or more of the first nuts defines therein an upper aperture. At least a portion of the upper aperture may be tapered. The lower aperture and the upper aperture of at least one of the first nuts may be connected to form an aperture extending through an entire thickness thereof. The lower aperture and the upper aperture of at least one of the first nuts may be isolated from each other (i.e., separated from each other by a portion of the first nut therebetween). The second shelf, the first support posts, and the first nuts may be collectively separable, as a modular unit, from the first shelf via a lifting force applied via the one or more first lift hooks.

Embodiments of the invention may include one or more of the following in any of a variety of combinations. One or more of the components may be a metallic part. The apparatus may resist creep deformation at the process temperature. The first, second, third, and/or fourth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The first, second, third, and/or fourth refractory metals may include, consist essentially of, or consist of Nb, Ta, Re, W, and/or Mo. The first shelf and/or the second shelf may define a plurality of perforations therethrough.

The apparatus may include a third shelf disposed over the second shelf, a plurality of second support posts, and a plurality of second nuts. The third shelf may include, consist essentially of, or consist of a fifth refractory metal having a melting point greater than the process temperature. The third shelf may define therethrough a plurality of apertures. The third shelf may include one or more second lift hooks extending therefrom. The one or more second lift hooks may extend from a top surface and/or a perimeter of the third shelf. The third shelf may define a plurality of perforations therethrough. One or more of the second support posts may include, consist essentially of, or consist of a sixth refractory metal having a melting point greater than the process temperature. One or more of the second support posts may have a tapered lower end for engagement with an upper aperture of a first nut. One or more of the second support posts may have a threaded upper end opposite the tapered lower end. One or more of the second support posts may define a support collar proximate the upper end. A lateral dimension (e.g., a width or diameter) of the second support post above the support collar being smaller than a lateral dimension (e.g., a width or diameter) of the second support post below the support collar. When an upper end of a second support post is received in an aperture of the third shelf, a portion of the third shelf proximate the aperture may rest upon the support collar of the second support post received in the aperture. When an upper end of a second support post is received in an aperture of the third shelf, at least a portion of the upper end of the second support post may extend above a top surface of the third shelf. One or more of the second nuts may include, consist essentially of, or consist of a seventh refractory metal having a melting point greater than the process temperature. One or more of the second nuts may define therein a lower aperture. At least a portion of the lower aperture may be threaded for engagement with an upper end of a second support post. The third shelf, the second support posts, and the second nuts may be collectively separable, as a modular unit, from the second shelf and the first shelf via a lifting force applied via the one or more second lift hooks. One or more of the second nuts may define therein an upper aperture. At least a portion of the upper aperture may be tapered. The lower aperture and the upper aperture of at least one of the second nuts may be connected to form an aperture extending through an entire thickness thereof. The lower aperture and the upper aperture of at least one of the second nuts may be isolated from each other (i.e., separated from each other by a portion of the second nut therebetween). The fifth, sixth, and/or seventh refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth, sixth, and/or seventh refractory metals may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys).

The first shelf may define a central aperture therethrough. The central aperture may have the shape of a square, rectangle, or circle. The apparatus may include a shelf support disposed below the first shelf. The shelf support may include or consist essentially of a plurality of interconnected cross braces. One or more of the cross braces may include, consist essentially of, or consist of a fifth refractory metal having a melting point greater than the process temperature. The apparatus may include a first support tube. The first support tube may have a lower end for extending through the central aperture of the first shelf. The lower end of the first support tube may define a plurality of notches. One or more of the notches may be configured to receive therein one of the cross braces of the shelf support. The first support tube may include, consist essentially of, or consist of a sixth refractory metal having a melting point greater than the process temperature. The fifth and/or sixth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth and/or sixth refractory metals may include, consist essentially of, or consist of Nb, Ta, Re, W, and/or Mo. The first support tube may have an upper end opposite the lower end. The upper end of the first support tube may define therein a plurality of notches. The apparatus may include a first support brace including or consisting essentially of a plurality of appendages for supporting the second shelf thereon. One or more of the appendages may be configured for receipt into one of the notches of the upper end of the first support tube. The appendages of the support brace may define a cross shape. The second shelf may define a central aperture therethrough. The central aperture may have the shape of a square, rectangle, or circle. The apparatus may include a second support tube. The second support tube may have a lower end for extending through the central aperture of the second shelf. The lower end of the second support tube may define a plurality of notches. One or more of the notches may be configured to receive therein one of the appendages of the support brace. The second support tube may include, consist essentially of, or consist of a seventh refractory metal having a melting point greater than the process temperature. The second support tube may have an upper end opposite the lower end. The upper end of the second support tube may define therein a plurality of notches. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys). The apparatus may include a base disposed beneath the shelf support. The base may include or consist essentially of (i) a plurality of spaced-apart cross bars each defining a plurality of apertures therethrough, and (ii) a plurality of spaced-apart through rods each extending through the apertures of multiple ones of the cross bars. The base may include one or more alignment features (e.g., posts, brackets, plates, etc.) extending upward therefrom. The shelf support may include one or more brackets each for receiving one of the one or more alignment features.

The apparatus may include a base disposed beneath the first shelf. The base may include or consist essentially of (i) a plurality of spaced-apart cross bars each defining a plurality of apertures therethrough, and (ii) a plurality of spaced-apart through rods each extending through the apertures of multiple ones of the cross bars. One or more of the cross bars may include, consist essentially of, or consist of a fifth refractory metal having a melting point greater than the process temperature. One or more of the through rods may include, consist essentially of, or consist of a sixth refractory metal having a melting point greater than the process temperature. The fifth and/or sixth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth and/or sixth refractory metals may include, consist essentially of, or consist of Nb, Ta, Re, W, and/or Mo. The apparatus may include a shelf support disposed below the first shelf and/or disposed above the base. The shelf support may include or consist essentially of a plurality of interconnected cross braces. One or more of the cross braces metals may include, consist essentially of, or consist of a seventh refractory metal having a melting point greater than the process temperature. The base may include one or more alignment features (e.g., posts, brackets, plates, etc.) extending upward therefrom. The shelf support may include one or more brackets each for receiving one of the one or more alignment features. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys).

In another aspect, embodiments of the invention feature a method of high-temperature brazing at a process temperature greater than approximately 1000° C. An apparatus is disposed within a furnace chamber. The apparatus includes or consists essentially of a first shelf, a second shelf disposed over the first shelf, a plurality of first support posts, and a plurality of first nuts. The first shelf includes, consists essentially of, or consists of a first refractory metal having a melting point greater than the process temperature. The first shelf defines therein or therethrough a plurality of apertures. The second shelf includes, consists essentially of, or consists of a second refractory metal having a melting point greater than the process temperature. The second shelf defines therein or therethrough a plurality of apertures. The second shelf includes one or more first lift hooks extending therefrom. The one or more first lift hooks may extend from a top surface and/or a perimeter of the second shelf. The first shelf may include one or more lift hooks extending therefrom. One or more of the first support posts includes, consists essentially of, or consists of a third refractory metal having a melting point greater than the process temperature. One or more of the first support posts has a tapered lower end for engagement with an aperture of the first shelf. One or more of the first support posts has a threaded upper end opposite the lower end. One or more of the first support posts defines a support collar proximate the upper end. A lateral dimension (e.g., a width or diameter) of the first support post above the support collar is smaller than a lateral dimension (e.g., a width or diameter) of the first support post below the support collar. When an upper end of a first support post is received in an aperture of the second shelf, a portion of the second shelf proximate the aperture rests upon the support collar of the first support post received in the aperture. When an upper end of a first support post is received in an aperture of the second shelf, at least a portion of the upper end of the first support post may extend above a top surface of the second shelf. One or more of the first nuts includes, consists essentially of, or consists of a fourth refractory metal having a melting point greater than the process temperature. One or more of the first nuts defines therein a lower aperture. At least a portion of the lower aperture may be threaded for engagement with an upper end of a first support post. One or more of the first nuts defines therein an upper aperture. At least a portion of the upper aperture may be tapered. The lower aperture and the upper aperture of at least one of the first nuts may be connected to form an aperture extending through an entire thickness thereof. The lower aperture and the upper aperture of at least one of the first nuts may be isolated from each other (i.e., separated from each other by a portion of the first nut therebetween). The second shelf, the first support posts, and the first nuts may be collectively separable, as a modular unit, from the first shelf via a lifting force applied via the one or more first lift hooks. On the first shelf and/or the second shelf of the apparatus are disposed (i) a first component, (ii) a second component, and (iii) a brazing material disposed between the first and second components. The brazing material may be in direct contact with the first and second components. A processing ambient is introduced within the furnace chamber. The process temperature is applied within the furnace chamber, thereby melting the brazing material and joining the first and second components at a brazed joint therebetween.

Embodiments of the invention may include one or more of the following in any of a variety of combinations. The first and/or second components may include, consist essentially of, or consist of a metallic part. The apparatus may resist creep deformation at the process temperature. Introducing the processing ambient may include or consist essentially of at least partially evacuating the furnace chamber (i.e., introducing a vacuum therein). Introducing the processing ambient may include or consist essentially of introducing a process gas within the furnace chamber. The process gas may include, consist essentially of, or consist of hydrogen.

The first, second, third, and/or fourth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The first, second, third, and/or fourth refractory metals may include, consist essentially of, or consist of Nb, Ta, Re, W, and/or Mo. The first shelf and/or the second shelf may define a plurality of perforations therethrough.

The apparatus may include a third shelf disposed over the second shelf, a plurality of second support posts, and a plurality of second nuts. The third shelf may include, consist essentially of, or consist of a fifth refractory metal having a melting point greater than the process temperature. The third shelf may define therethrough a plurality of apertures. The third shelf may include one or more second lift hooks extending therefrom. The one or more second lift hooks may extend from a top surface and/or a perimeter of the third shelf. The third shelf may define a plurality of perforations therethrough. One or more of the second support posts may include, consist essentially of, or consist of a sixth refractory metal having a melting point greater than the process temperature. One or more of the second support posts may have a tapered lower end for engagement with an upper aperture of a first nut. One or more of the second support posts may have a threaded upper end opposite the tapered lower end. One or more of the second support posts may define a support collar proximate the upper end. A lateral dimension (e.g., a width or diameter) of the second support post above the support collar being smaller than a lateral dimension (e.g., a width or diameter) of the second support post below the support collar. When an upper end of a second support post is received in an aperture of the third shelf, a portion of the third shelf proximate the aperture may rest upon the support collar of the second support post received in the aperture. When an upper end of a second support post is received in an aperture of the third shelf, at least a portion of the upper end of the second support post may extend above a top surface of the third shelf. One or more of the second nuts may include, consist essentially of, or consist of a seventh refractory metal having a melting point greater than the process temperature. One or more of the second nuts may define therein a lower aperture. At least a portion of the lower aperture may be threaded for engagement with an upper end of a second support post. The third shelf, the second support posts, and the second nuts may be collectively separable, as a modular unit, from the second shelf and the first shelf via a lifting force applied via the one or more second lift hooks. One or more of the second nuts may define therein an upper aperture. At least a portion of the upper aperture may be tapered. The lower aperture and the upper aperture of at least one of the second nuts may be connected to form an aperture extending through an entire thickness thereof. The lower aperture and the upper aperture of at least one of the second nuts may be isolated from each other (i.e., separated from each other by a portion of the second nut therebetween). The fifth, sixth, and/or seventh refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth, sixth, and/or seventh refractory metals may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys).

The first shelf may define a central aperture therethrough. The central aperture may have the shape of a square, rectangle, or circle. The apparatus may include a shelf support disposed below the first shelf. The shelf support may include or consist essentially of a plurality of interconnected cross braces. One or more of the cross braces may include, consist essentially of, or consist of a fifth refractory metal having a melting point greater than the process temperature. The apparatus may include a first support tube. The first support tube may have a lower end for extending through the central aperture of the first shelf. The lower end of the first support tube may define a plurality of notches. One or more of the notches may be configured to receive therein one of the cross braces of the shelf support. The first support tube may include, consist essentially of, or consist of a sixth refractory metal having a melting point greater than the process temperature. The fifth and/or sixth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth and/or sixth refractory metals may include, consist essentially of, or consist of Nb, Ta, Re, W, and/or Mo. The first support tube may have an upper end opposite the lower end. The upper end of the first support tube may define therein a plurality of notches. The apparatus may include a first support brace including or consisting essentially of a plurality of appendages for supporting the second shelf thereon. One or more of the appendages may be configured for receipt into one of the notches of the upper end of the first support tube. The appendages of the support brace may define a cross shape. The second shelf may define a central aperture therethrough. The central aperture may have the shape of a square, rectangle, or circle. The apparatus may include a second support tube. The second support tube may have a lower end for extending through the central aperture of the second shelf. The lower end of the second support tube may define a plurality of notches. One or more of the notches may be configured to receive therein one of the appendages of the support brace. The second support tube may include, consist essentially of, or consist of a seventh refractory metal having a melting point greater than the process temperature. The second support tube may have an upper end opposite the lower end. The upper end of the second support tube may define therein a plurality of notches. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys). The apparatus may include a base disposed beneath the shelf support. The base may include or consist essentially of (i) a plurality of spaced-apart cross bars each defining a plurality of apertures therethrough, and (ii) a plurality of spaced-apart through rods each extending through the apertures of multiple ones of the cross bars. The base may include one or more alignment features (e.g., posts, brackets, plates, etc.) extending upward therefrom. The shelf support may include one or more brackets each for receiving one of the one or more alignment features.

The apparatus may include a base disposed beneath the first shelf. The base may include or consist essentially of (i) a plurality of spaced-apart cross bars each defining a plurality of apertures therethrough, and (ii) a plurality of spaced-apart through rods each extending through the apertures of multiple ones of the cross bars. One or more of the cross bars may include, consist essentially of, or consist of a fifth refractory metal having a melting point greater than the process temperature. One or more of the through rods may include, consist essentially of, or consist of a sixth refractory metal having a melting point greater than the process temperature. The fifth and/or sixth refractory metals may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The fifth and/or sixth refractory metals may include, consist essentially of, or consist of Nb, Ta, Re, W, and/or Mo. The apparatus may include a shelf support disposed below the first shelf and/or disposed above the base. The shelf support may include or consist essentially of a plurality of interconnected cross braces. One or more of the cross braces metals may include, consist essentially of, or consist of a seventh refractory metal having a melting point greater than the process temperature. The base may include one or more alignment features (e.g., posts, brackets, plates, etc.) extending upward therefrom. The shelf support may include one or more brackets each for receiving one of the one or more alignment features. The seventh refractory metal may include, consist essentially of, or consist of a TZM alloy. The TZM alloy may include, consist essentially of, or consist of approximately 0.40-approximately 0.55 weight percent Ti, approximately 0.06-approximately 0.12 weight percent Zr, and the balance Mo. The TZM alloy may include, consist essentially of, or consist of approximately 0.50 weight percent Ti, approximately 0.08 weight percent Zr, and the balance Mo. The seventh refractory metal may include, consist essentially of, or consist of Nb, Ta, Re, W, and/or Mo. Two or more (in any combination), or even all, of the first, second, third, fourth, fifth, sixth, and seventh refractory metals may include, consist essentially of, or consist of the same material (e.g., metal or metal alloy). Two or more (in any combination), or even each, of the first, second, third, fourth, fifth, sixth, and seventh refractory metals may include, consist essentially of, or consist of different materials (e.g., metals or metal alloys).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities. Herein, in a part "defining an aperture therethrough," the aperture extends through the thickness of the part unless otherwise indicated; in a part "defining an aperture therein," the aperture may extend through only a portion of the thickness of the part, or the aperture may extend through the entire thickness.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 13C is a side view of a shelf-support rod module of a rack in accordance with various embodiments of the invention;

FIG. 13D is a cross-sectional view of the module of FIG. 13C;

FIGS. 13E and 13F are enlarged views of portions of the module of FIG. 13D;

DETAILED DESCRIPTION

Figure 1A:
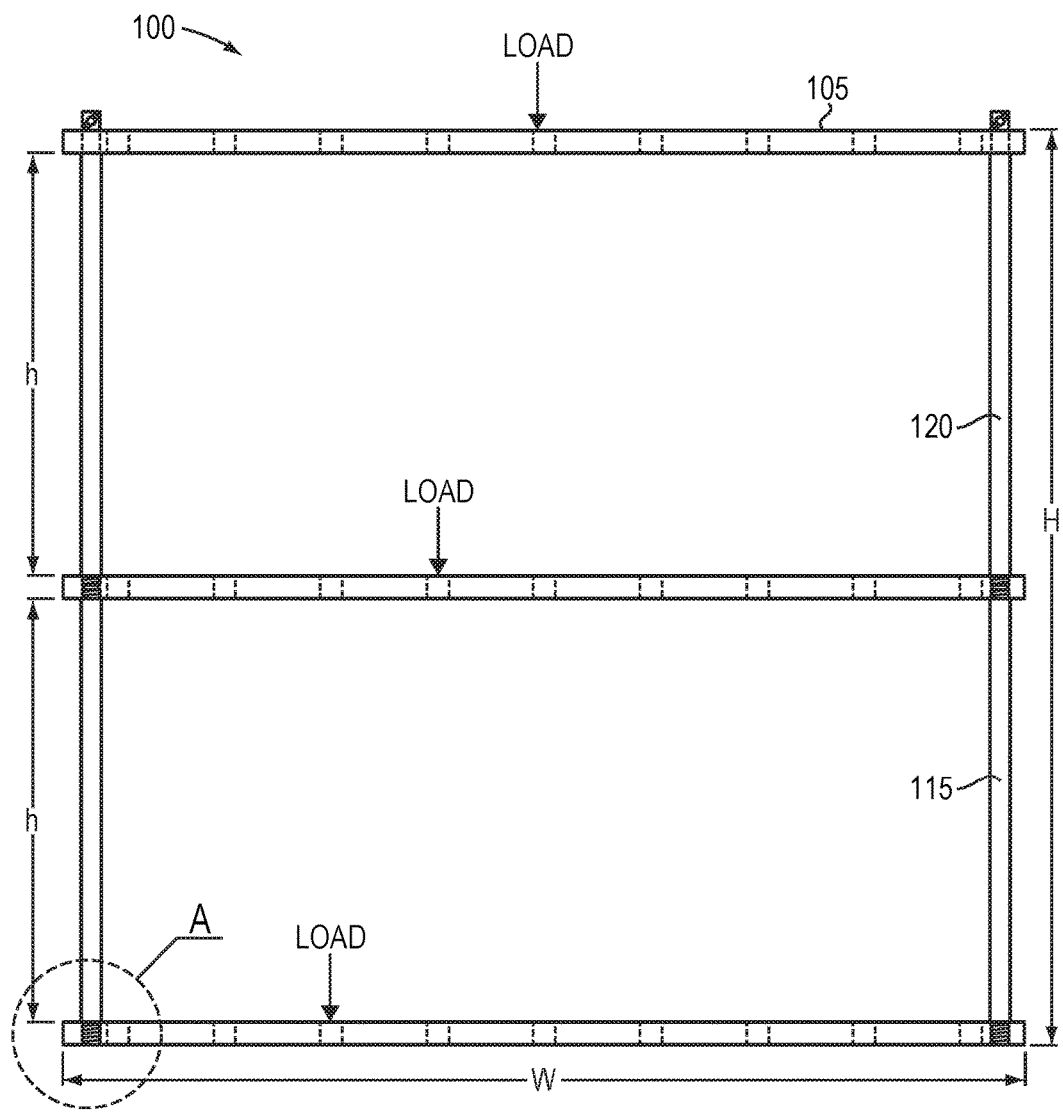
FIGS. 1A and 1B are side views of a rack in accordance with various embodiments of the invention.
Figure 1B:
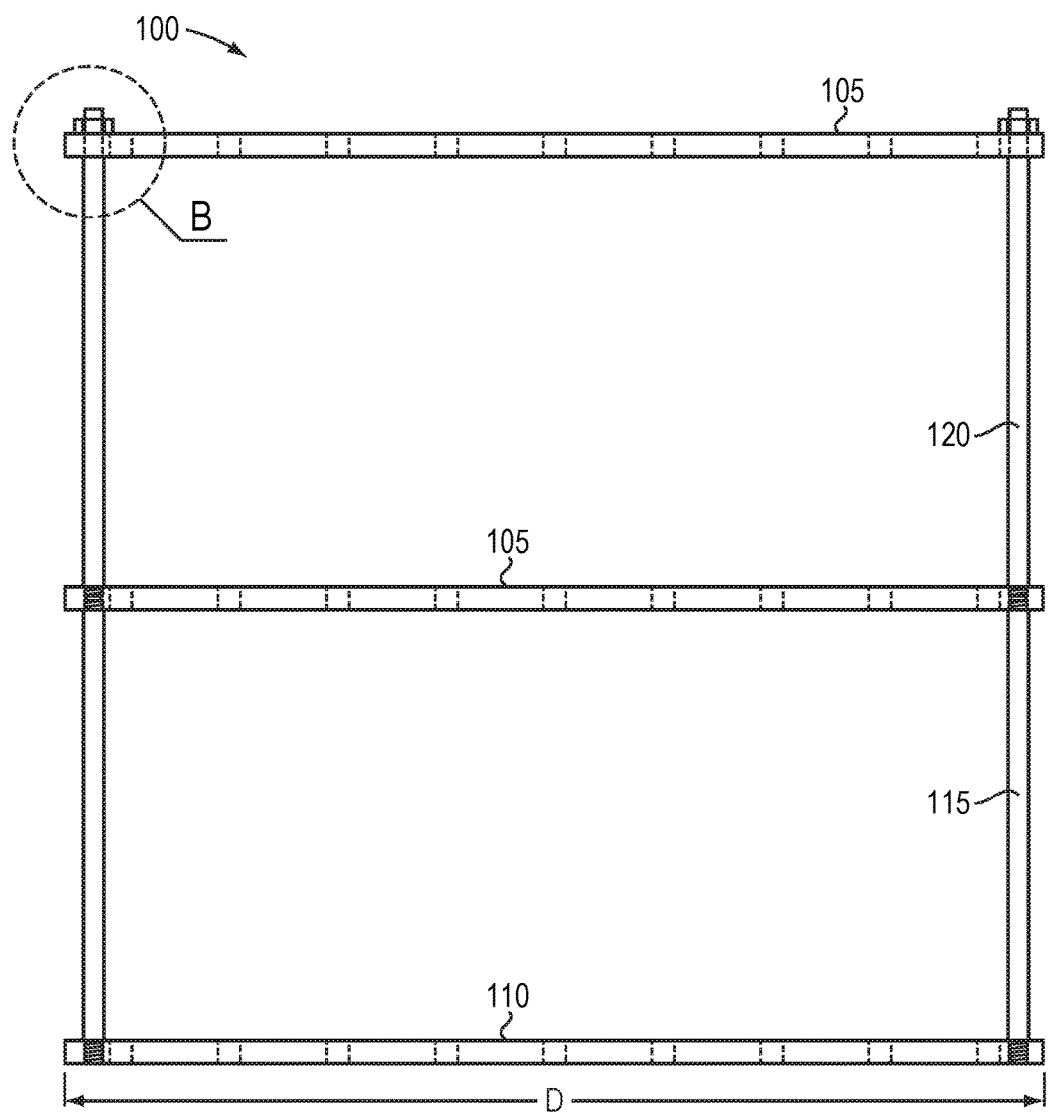

FIGS. 1A and 1B depict side views of a support rack 100 in accordance with embodiments of the present invention along perpendicular directions. As shown, the rack 100 typically includes or consists essentially of two, three, or more shelves (or "trays") 105, 110 separated by multiple lower support posts 115 and multiple upper support posts 120. The bottom shelf 110 and upper shelves 105 are separated by a spacing h, and the rack 100 has a total height H, a width W, and a depth D. The values of h, H, W, and D may be selected to meet the needs of the specific high-temperature process and, e.g., the size of the parts to be placed on the shelves 105, 110 for processing and/or the size of the furnace chamber in which the rack 100 is to be placed for processing. In various embodiments, as detailed below and in other figures, racks may define substantially cylindrical shapes and feature substantially circular shelves. In various embodiments, at least some of the shelves 105, 110 and/or the posts 115, 120 include, consist essentially of, or consist of one or more refractory materials (e.g., refractory metals) having melting points higher than the temperatures utilized for high-temperature brazing processes (e.g., 1000° C.-1100° C.). In various embodiments, at least some of the shelves 105, 110 and/or the posts 115, 120 include, consist essentially of, or consist of one or more TZM alloys. In other embodiments, at least some of the shelves 105, 110 and/or the posts 115, 120 include, consist essentially of, or consist of one or more refractory metals, e.g., Nb, Ta, Re, W, and/or Mo. In various embodiments, at least some of the shelves 105, 110 and/or the posts 115, 120 incorporate one or more alloying elements, for example La, at concentrations of, e.g., approximately 0.01% to approximately 1%.

Figure 2A:
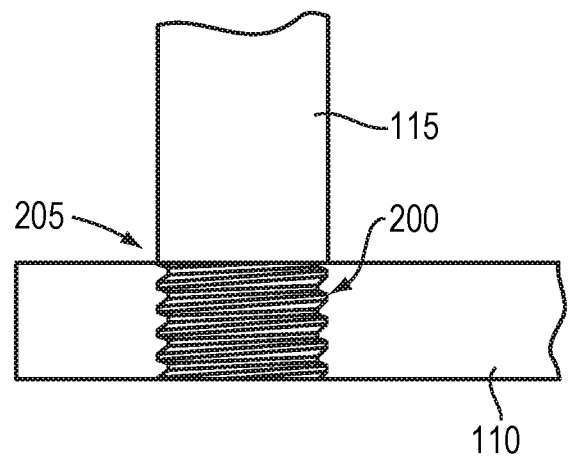
FIG. 2A is a cross-sectional view of a threaded connection between a support post and a shelf in accordance with various embodiments of the invention.

FIG. 2A is a magnified view of threaded bottom end 200 of a post 115 engaged with a complementarily threaded hole in shelf 110, thereby forming a threaded connection between shelf 110 and support post 115, indicated as circled area A in FIG. 1A, that locks the two parts together. In various embodiments, the threaded connection provides superior strength and high-temperature stability (against, e.g., deformation processes such as creep) compared with conventional pin- or rivet-based connections. In various embodiments, there is also a shoulder machined into the threaded bottom end 200 to properly align the support post 115 and prevent the threads from bearing the weight of the other shelves and workpieces (i.e., the load supported by the shelves). As shown, the shoulder corresponds to a portion of the post 115 proximate the threaded end 200 having a larger diameter (or other lateral dimension, for posts having non-circular cross-sections) than that of the threaded end 200 and/or the complementarily threaded hole to which threaded end 200 engages.

Figure 2B:
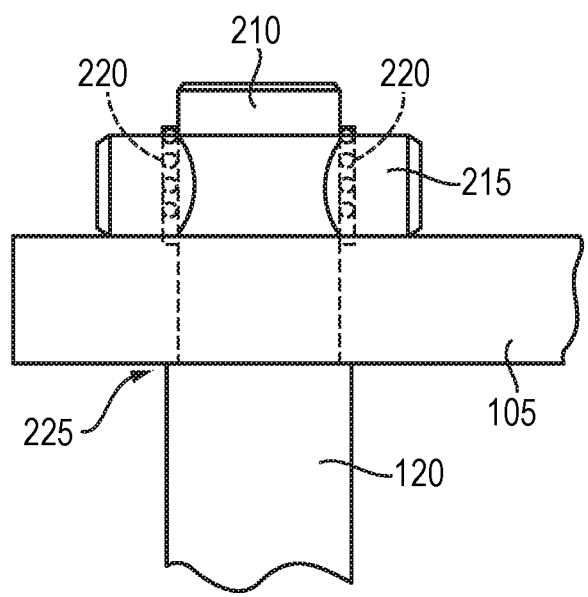
FIG. 2B is a side view of a connection between a support post and a shelf utilizing a locking pin in accordance with various embodiments of the invention.

FIG. 2B is a magnified view of the locking connection between the topmost shelf 105 and the upper support post 120 indicated as circled area B in FIG. 1B. As shown, the upper end 210 of the support post 120 is disposed through an aperture defined by the shelf 105, and a locking pin 215 slides through an aperture (or "dowel pin mount") defined by the support post 120, thereby preventing withdrawal of the support post 120 through the shelf 105. In various embodiments, the locking pin 215 is held in place by one or more (e.g., two) retaining wires 220. In various embodiments, the locking pin 215 and retaining wires 220 include, consist essentially of, or consist of one or more refractory materials (e.g., refractory metals) having melting points higher than the temperatures utilized for high-temperature brazing processes (e.g., 1000° C.-1100° C.). In various embodiments, the locking pin 215 and retaining wires 220 include, consist essentially of, or consist of one or more TZM alloys, or of one or more refractory metals, e.g., Nb, Ta, Re, W, and/or Mo. In various embodiments, the retaining wires 220 include, consist essentially of, or consist of Mo. As shown in FIG. 2B, the support post 120 may also incorporate a shoulder 225 that helps support the weight of shelf 105 (and any workpieces thereon) while enabling upper end 210 to fit through the aperture defined in shelf 105.

Figure 3A:
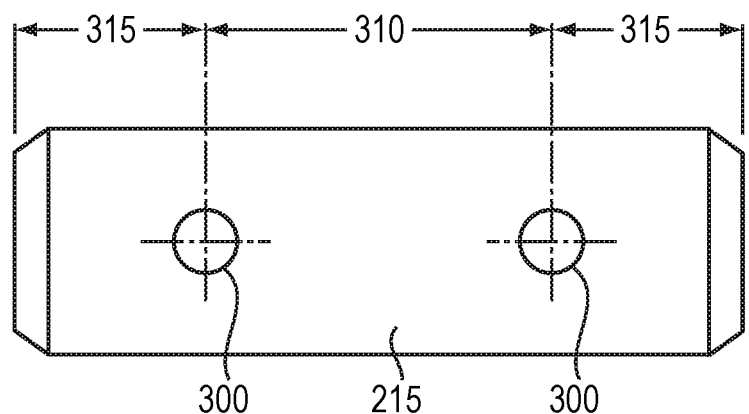
FIGS. 3A and 3B are side views of a locking pin in accordance with various embodiments of the invention.
Figure 3B:
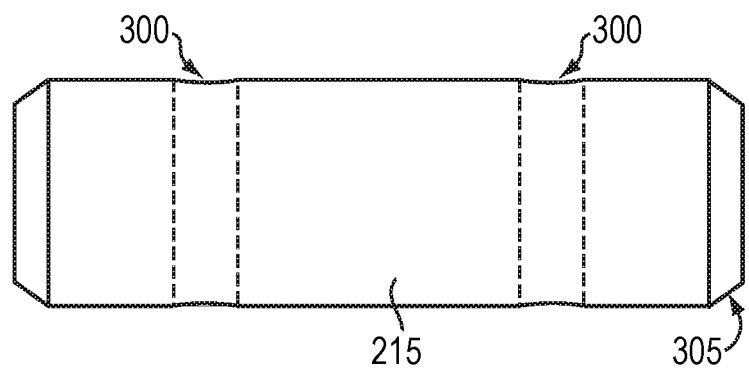

FIGS. 3A and 3B are side views of a locking pin 215 in accordance with various embodiments of the invention. As shown, the locking pin 215 may define two or more apertures 300 therethrough, each of which may receive a retaining wire 220. The locking pin 215 may also feature tapered ends 305 to facilitate insertion of the locking pin 215 into the dowel pin mount of the support post 120. In various embodiments, as shown in FIG. 3A, the locking pin 215 features two apertures 300 spaced apart by a distance 310 that is greater than or approximately equal to the diameter (or other lateral dimension) of upper end 210 of support post 120. Each aperture 310 may be spaced away from an end of locking pin 215 by a distance 315 that may be, for example, approximately 20% to approximately 50% of distance 310.

Figure 4:
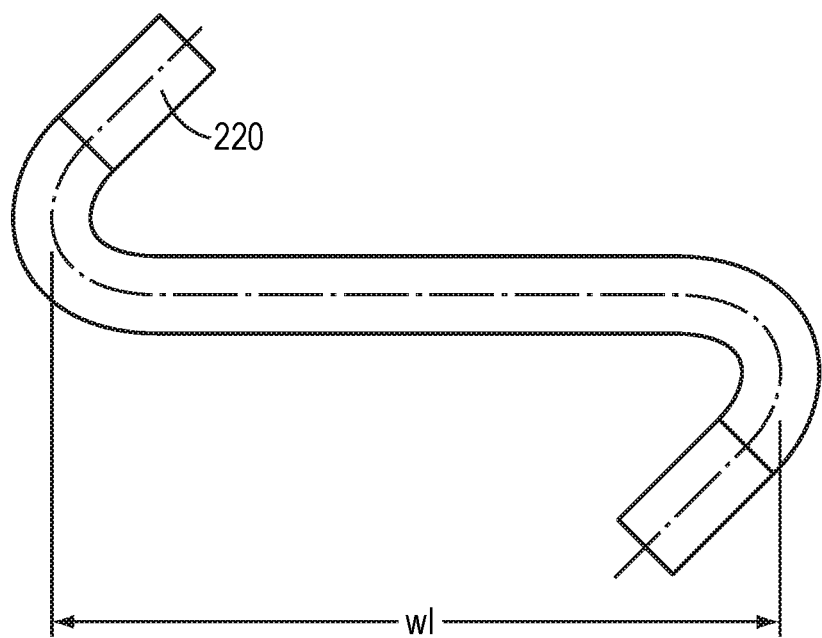
FIG. 4 is a plan view of a retaining wire in accordance with various embodiments of the invention.

FIG. 4 is a plan view of a retaining wire 220 in accordance with various embodiments of the invention. As shown, the retaining wire 220 may be initially substantially straight for insertion through an aperture 300 and may subsequently be deformed to incorporate one or bends to lock it into place after insertion through an aperture 300 of a locking pin 215. The retaining wire 220 may have a substantially straight length w1 between such bends, where length w1 is preferably greater than or substantially equal to the diameter (or other lateral dimension) of the locking pin 215.

Figure 5:
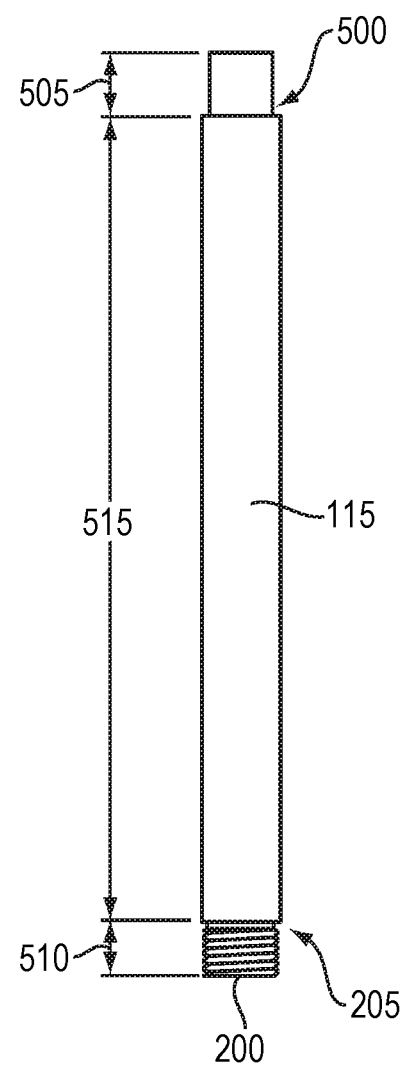
FIG. 5 is a side view of a support post in accordance with various embodiments of the invention.

FIG. 5 is a side view of a lower support post 115 in accordance with various embodiments of the present invention. As shown, the support post 115 has a threaded lower end 200 for engagement within a complementarily threaded aperture in a shelf 110, thereby locking support post 115 and shelf 110 together. There is also a shoulder 205 machined into the lower end 200 to support weight. As also shown, the upper end of support post 115 may have a smaller diameter (or other lateral dimension) than that of the majority of the length of support post 115, thereby forming a support collar 500 upon which a shelf 110 rests when connected to the support post 115. This support collar 500 may provide additional stability and resistance to deformation when the rack 100 is subjected to high process temperatures. As shown, the upper end of support post 115 that defines collar 500 may have a height 505 (which may be, e.g., less than or approximately equal to the thickness of a shelf 105), and threaded end 200 may have a height 510 (which may be, e.g., less than or approximately equal to the thickness of a shelf 105). The center portion of the support post 115 between those ends may have a height 515 that substantially defines the spacing between various shelves 105 within rack 100.

Figure 6:
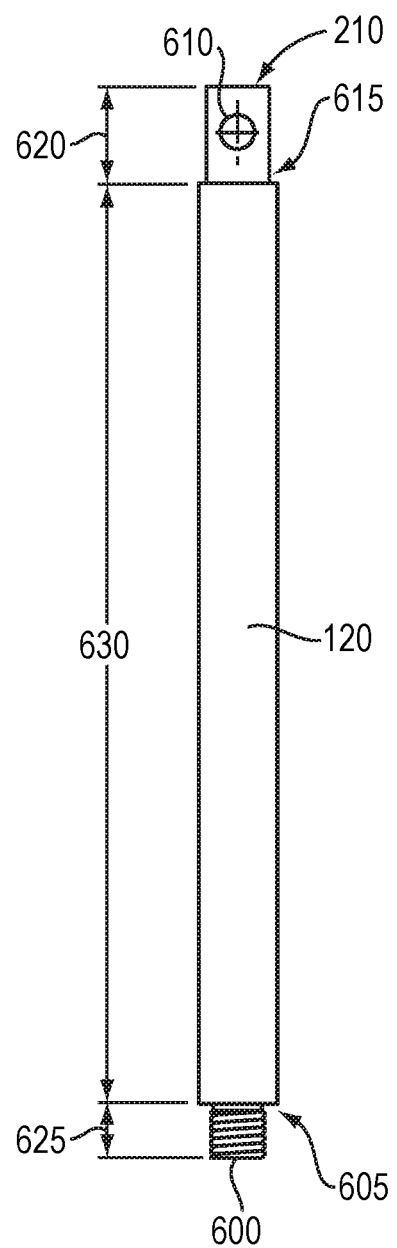
FIG. 6 is a side view of a support post in accordance with various embodiments of the invention.

FIG. 6 is a side view of an upper support post 120 in accordance with various embodiments of the present invention. As shown, the support post 120 has a threaded lower end 600 for engagement within a threaded aperture in a shelf 110, thereby locking support post 120 and shelf 110 together. There is also a shoulder 605 machined into the lower end to support weight. As also shown, the upper end 210 of support post 120 may define therethrough a dowel pin mount 610 for receiving a locking pin 215 in order to lock support post 120 to a shelf 105, as described above. The upper end 210 may also feature a shoulder 615 machined therein to support at least some of the weight of shelf 105. As shown, the upper end 210 of support post 120 that defines collar 615 may have a height 620 (which may be, e.g., greater than or approximately equal to the sum of the thickness of a shelf 105 and the thickness of locking pin 215), and threaded end 600 may have a height 625 (which may be, e.g., less than or approximately equal to the thickness of a shelf 105). The center portion of the support post 120 between those ends may have a height 630 that substantially defines the spacing between a topmost shelf 105 and the shelf 105 immediately therebelow within rack 100.

Figure 7:
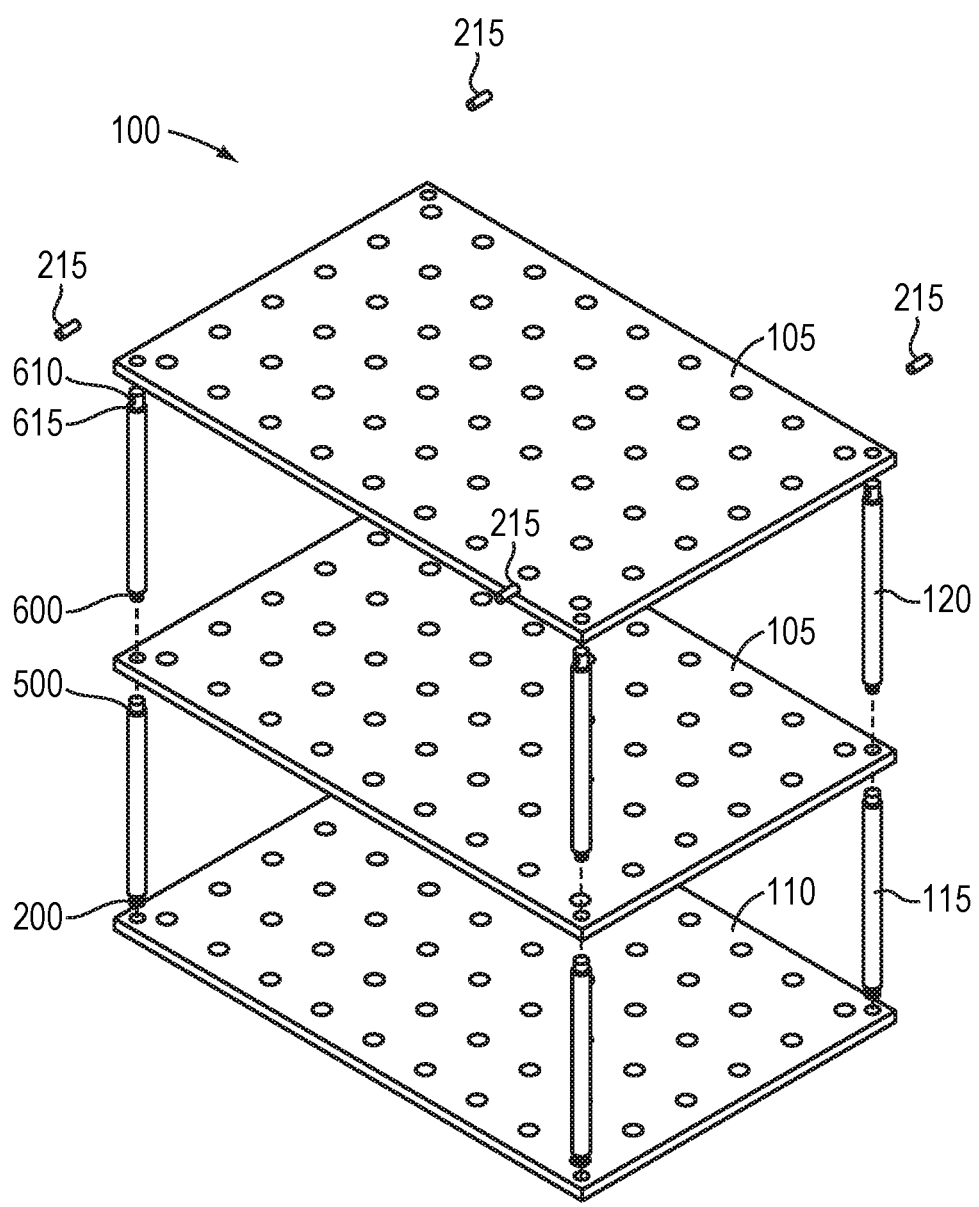
FIG. 7 is an exploded perspective view of a rack in accordance with various embodiments of the invention.
Figure 8:
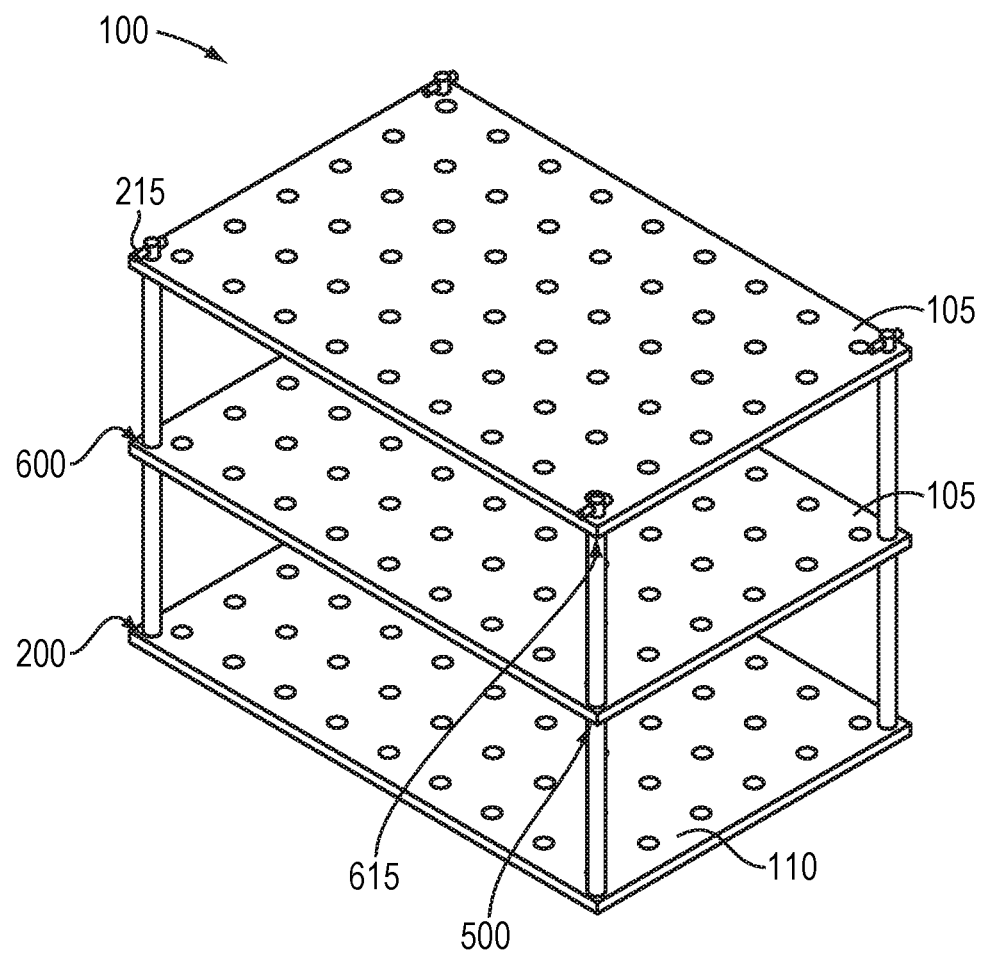
FIG. 8 is a perspective view of an assembled rack in accordance with various embodiments of the invention.

FIGS. 7 and 8 are, respectively, an exploded perspective view and a perspective view of an assembled rack 100 in accordance with embodiments of the present invention. As shown, multiple support posts 115 are disposed between shelves 105, 110; the threaded lower ends of each support post 115 are engaged within threaded apertures defined in the shelves 105, 110, and the support collars 500 disposed on the upper ends of each support post 115 provide additional support for the shelf 105 thereabove. As also shown, multiple support posts 120 are disposed between the topmost shelf 105 and the shelf 105 immediately therebelow; the threaded lower ends 600 of each support post 120 are engaged within threaded apertures defined in the shelf 105, and the dowel pin mounts 610 of the upper ends of the support posts 120 receive locking pins 215 therethrough. The locking pins 215 may receive one or more retaining wires 220 therethrough, as described above.

Figure 9:
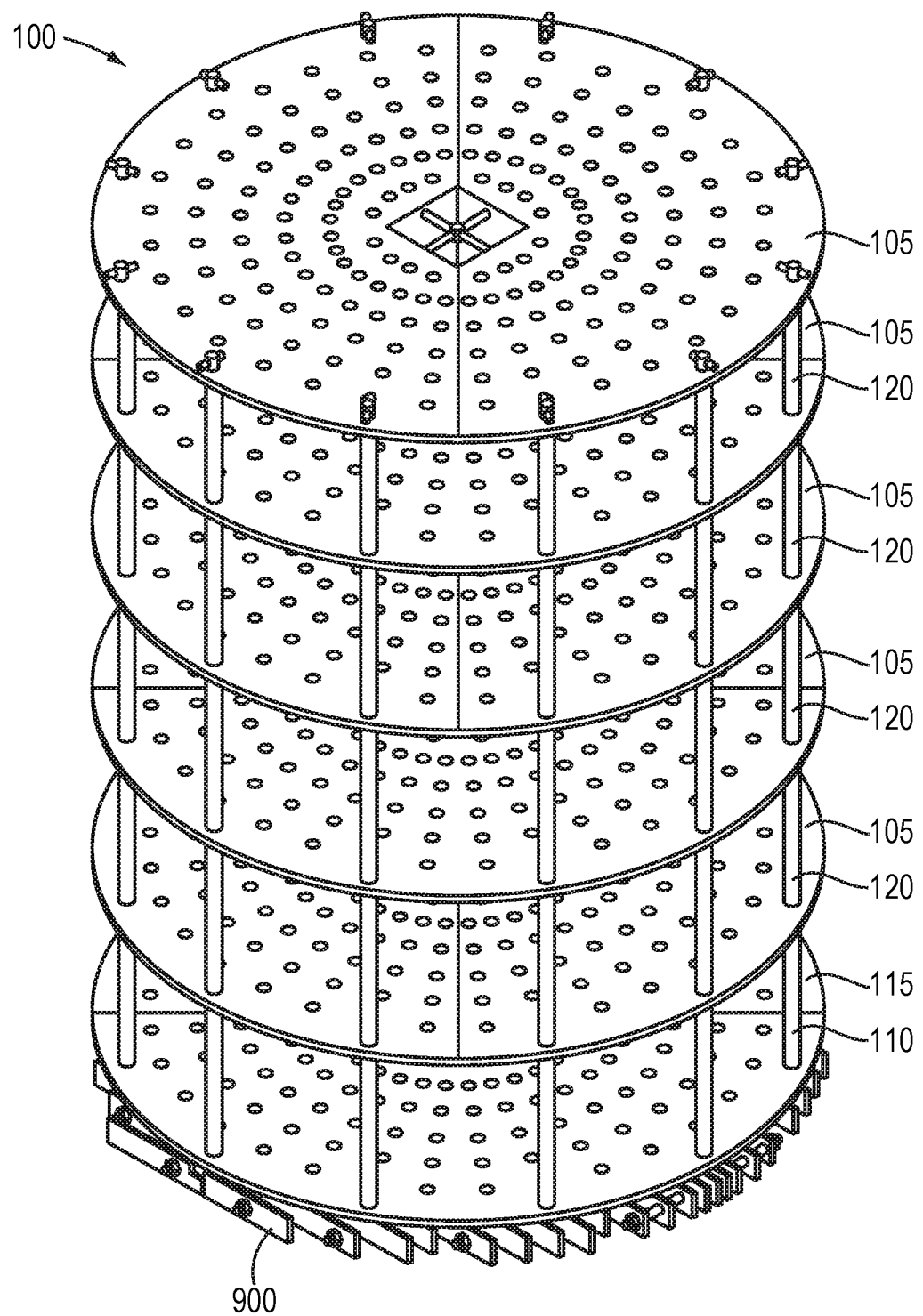
FIG. 9 is a perspective view of an assembled rack in accordance with various embodiments of the invention.
Figure 10:
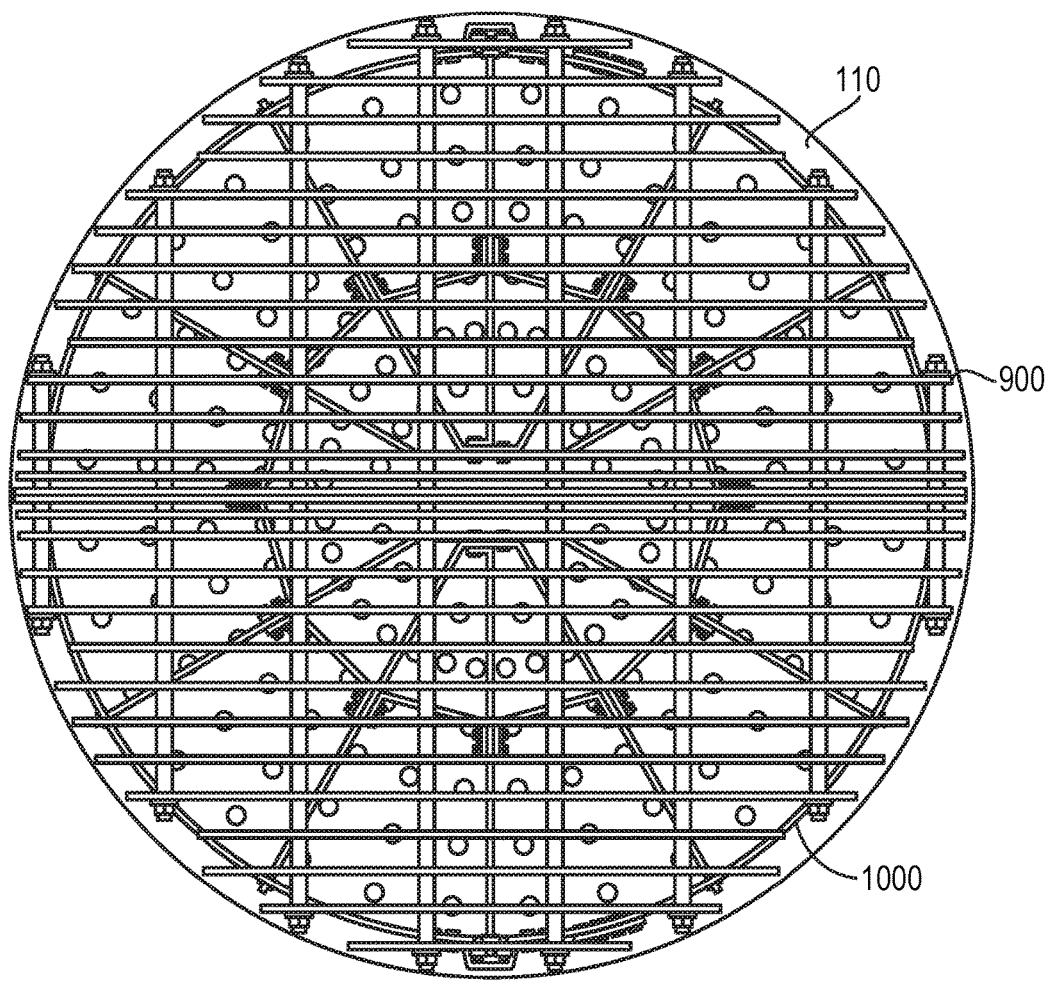
FIG. 10 is a bottom view of the rack of FIG. 9.

While the rack 100 is depicted in FIGS. 1A, 1B, 7, and 8 as having rectangular shelves 105, 110 separated by support posts disposed at each corner, other shapes and configurations are within the scope of the present invention. For example, the shelves 105, 110 may be circular or have any polygonal shape, and two, three, four, or even more support posts may be disposed between the shelves along the perimeters thereof. FIG. 9 depicts an exemplary embodiment of a rack 100 incorporating circular perforated shelves 105, 110. In addition to various aspects detailed above, rack 100 of FIG. 9 incorporates a base 900 on which the bottom shelf 110 is disposed. In various embodiments, a shelf support 1000 (not visible in FIG. 9; see FIGS. 10 and 12A) may be disposed between the shelf 110 and the base 900. FIG. 10 is a bottom view of the rack 100 of FIG. 9 illustrating the base 900, the shelf 110, and the shelf support 1000 therebetween. The rack 100 may also include one or more center support tubes and support brackets, as shown in more detail for rack 1300 in FIG. 13B.

Figure 11A:
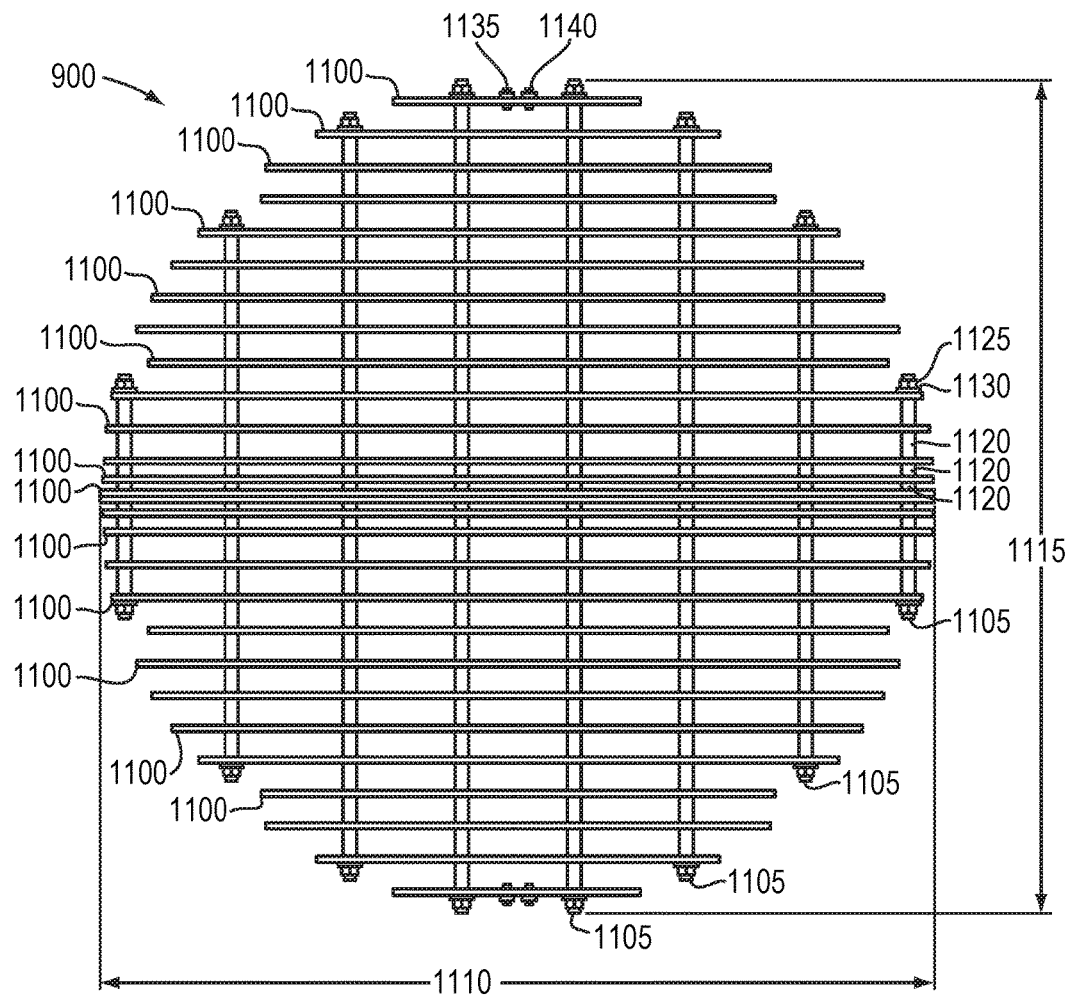
FIG. 11A is a plan view of a rack base in accordance with various embodiments of the invention.
Figure 11B:
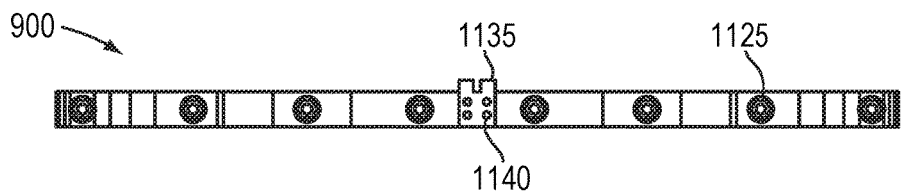
FIG. 11B is a side view of the rack base of FIG. 11A.

FIGS. 11A and 11B depict the base 900 in greater detail. Base 900 may include or consist essentially of a collection of cross bars and through rods that form a mesh-like "grating" structure through which gases in the processing chamber may flow freely and space the shelf 110 (and/or the shelf support 1000) away from the floor of the processing chamber. In the embodiment depicted in FIGS. 11A and 11B, the base includes or consists essentially of a series of cross bars 1100 held together by a series of through rods 1105 that extend through apertures defined within the cross bars 1100. As also shown in FIG. 9, the cross bars 1100 may be substantially flat and rectangular, and the through rods 1105 may be substantially cylindrical. The cross bars 1100 and/or the through rods 1105 may have various different lengths, and, as shown in FIG. 11A, these elements may, when assembled, provide the base 900 with a size and shape approximately equal to that of one of the shelves 105, 110 (e.g., approximately circular). That is, a lateral dimension (e.g., diameter) 1110 of the base 900 may be approximately equal to a lateral dimension (e.g., diameter) 1115 of the base 900 perpendicular to dimension 1110.

In order to maintain a consistent spacing between various ones of the cross bars 1100, a series of hollow spacers 1120 may be disposed between the cross bars 1100, and the through rods 1105 may extend through the spacers 1120. The spacers 1120 may have diameters (or other lateral dimensions) larger than those of the apertures defined by cross bars 1100 through which the through rods 1105 extend, thereby preventing movement of the spacers 1120 through the apertures and alteration of spacings between various cross bars 1100. As shown in FIGS. 11A and 11B, the through rods 1105 may be fastened to the cross bars 1100 via a series of threaded nuts 1125 and washers 1130. In addition, the base may incorporate one or more alignment brackets 1135 incorporated within or attached to one or more of the cross bars 1100. As shown, the alignment brackets 1135 may be attached to one or more of the outermost cross bars 1100 via one or more rivets 1140. The alignment brackets 1135 may protrude upward from the base 900 and interface with one or more complementary features in shelf support 1000 and/or the shelf 110. For example, the protruding portion of an alignment bracket 1135 may extend into a bracket within shelf support 1000 (as described in further detail below), and/or the alignment bracket 1135 may define one or more notches within which a protruding feature from shelf support 1000 or shelf 110 may fit.

In various embodiments, one or more of the components of base 900 (e.g., cross bars 1100, through rods 1105, spacers 1120, nuts 1125, washers 1130, alignment brackets 1135, and/or rivets 1140) include, consist essentially of, or consist of one or more TZM alloys. In other embodiments, one or more of the components of base 900 include, consist essentially of, or consist of one or more refractory metals, e.g., Nb, Ta, Re, W, and/or Mo. In various embodiments, one or more of the components of base 900 incorporate one or more alloying elements, for example La, at concentrations of, e.g., approximately 0.01% to approximately 1%.

Figure 12A:
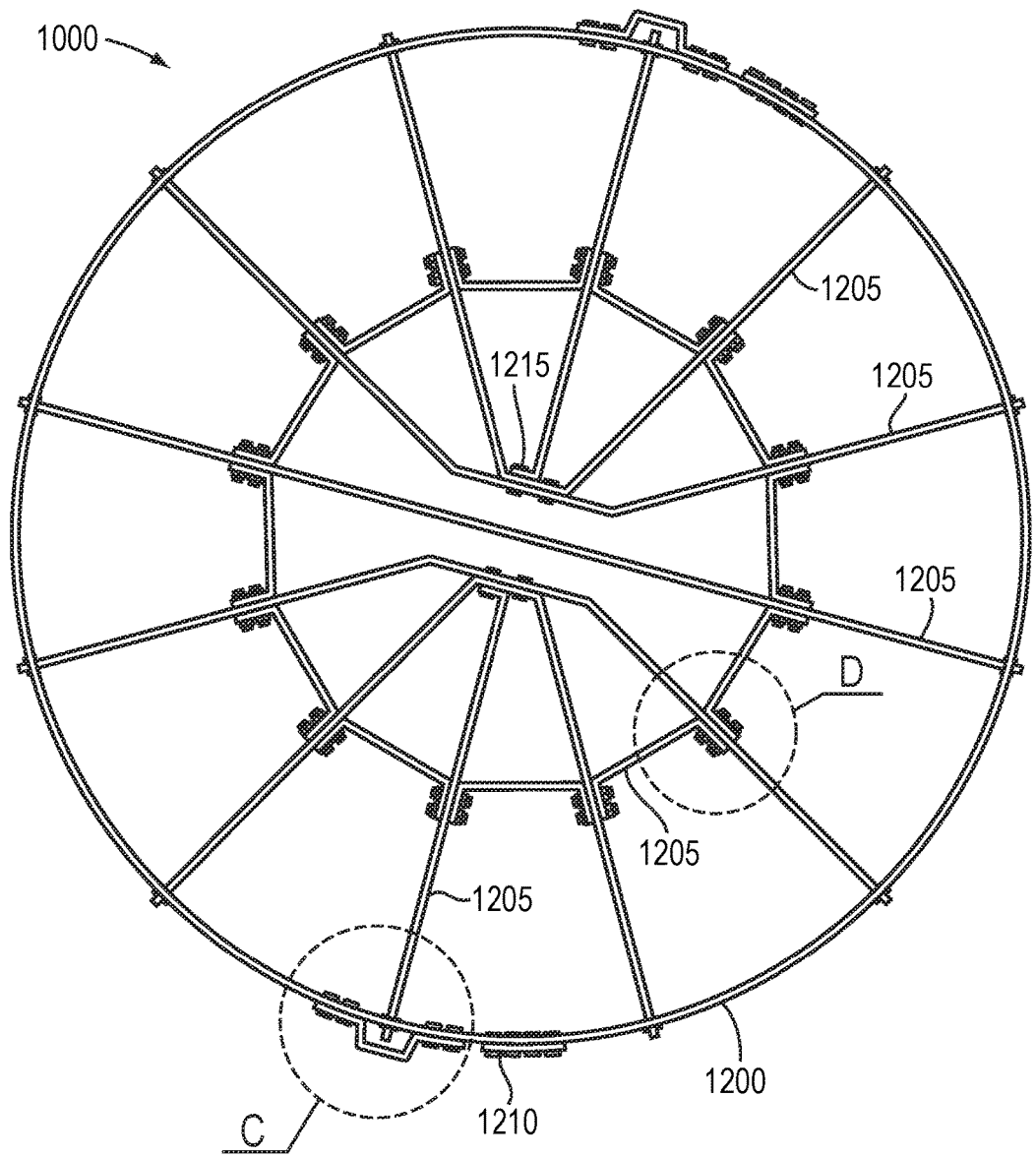
FIG. 12A is a plan view of a shelf support in accordance with various embodiments of the invention.

As mentioned above, a shelf support 1000 may be disposed between base 900 and shelf 110. The shelf support 1000 may, for example, provide additional support to shelf 110 and all of the other parts of the apparatus thereover. The shelf support 1000 may even provide additional space between base 900 and shelf 110 for the flow of process gas through the apparatus. FIG. 12A depicts an exemplary shelf support 1000 in accordance with embodiments of the present invention. In the illustrated exemplary embodiment, the shelf support 1000 includes or consists essentially of a shelf ring 1200 and a series of cross braces 1205 that stabilize the shelf ring 1200 against deformation or twisting. The shelf ring 1200 may have a size and shape (e.g., perimeter shape) that approximate that of base 900 and/or shelf 110. For example, as shown in FIG. 12A, the shelf support 1000 may be substantially circular and may have a diameter approximately equal to or less than that of base 900 and/or shelf 110. The shelf ring 1200 may be fabricated (e.g., cast or wrought) in its final (e.g., circular) shape, or the shelf ring 1200 may begin as substantially straight and deformed such that the ends of shelf ring 1200 come together to make a closed shape. In other embodiments, the shelf ring 1200 may initially be multiple discrete parts with their ends brought together to form the closed shape. In such embodiments, the ends of shelf ring 1200 (or its component pieces) may be fastened together via one or more fasteners such as joining strips 1210 that may be attached to the shelf ring 1200 via, e.g., one or more rivets. As shown in FIG. 12A, various ones of the cross braces 1205 may also be fastened together via, e.g., one or more rivets 1215.

Figure 12B:
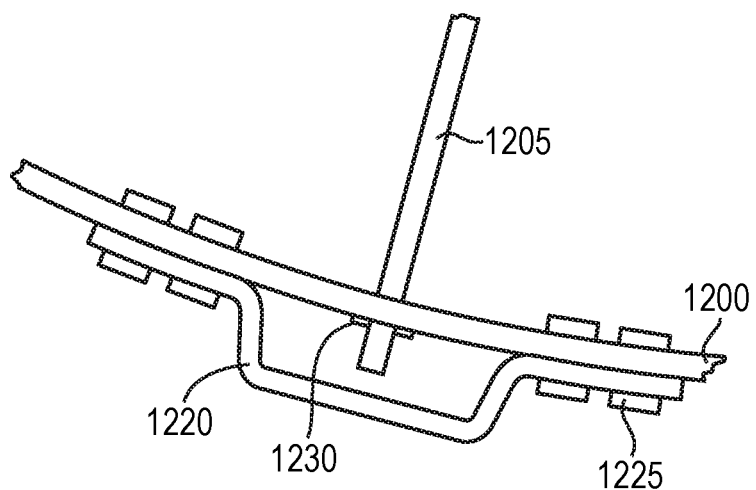
FIGS. 12B and 12C are enlarged views of portions of the shelf support for FIG. 12A.
Figure 12C:
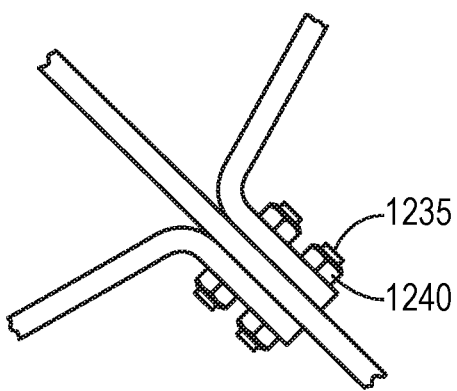

FIGS. 12B and 12C depict features that may be present in exemplary shelf supports 1000 in accordance with embodiments of the present invention. FIG. 12B, corresponding to circled area C in FIG. 12A, depicts a bracket 1220 fastened to the shelf ring 1200 via one or more rivets 1225. As shown in FIG. 12A, the shelf support 1000 may incorporate one or more such brackets 1220 along the perimeter of shelf ring 1200. In various embodiments, each bracket 1220 is sized and shaped to receive an alignment bracket 1135 protruding from base 900, thereby facilitating alignment of the base 900 with the shelf support 1000. As also shown in FIG. 12B, various ones of the cross braces 1205 may extend through apertures defined by the shelf ring 1200 and held in place via retaining wires 1230 that may each extend through a cross brace 1205 and/or be wrapped around a cross brace 1205 to prevent retraction of the cross brace 1205 back through the shelf ring 1200. As shown in FIG. 12C, corresponding to the circled area D in FIG. 12A, various ones of the cross braces 1205 may be fastened together via, e.g., one or more threaded studs (e.g., double-ended threaded studs) 1235 and one or more complementarily threaded nuts 1240.

In various embodiments, one or more of the components of shelf support 1000 (e.g., shelf ring 1200, cross braces 1205, joining strips 1210, rivets 1215, brackets 1220, rivets 1225, retaining wires 1230, studs 1235, and/or nuts 1240) include, consist essentially of, or consist of one or more TZM alloys. In other embodiments, one or more of the components of shelf support 1000 include, consist essentially of, or consist of one or more refractory metals, e.g., Nb, Ta, Re, W, and/or Mo. In various embodiments, one or more of the components of shelf support 1000 incorporate one or more alloying elements, for example La, at concentrations of, e.g., approximately 0.01% to approximately 1%.

Figure 13A:
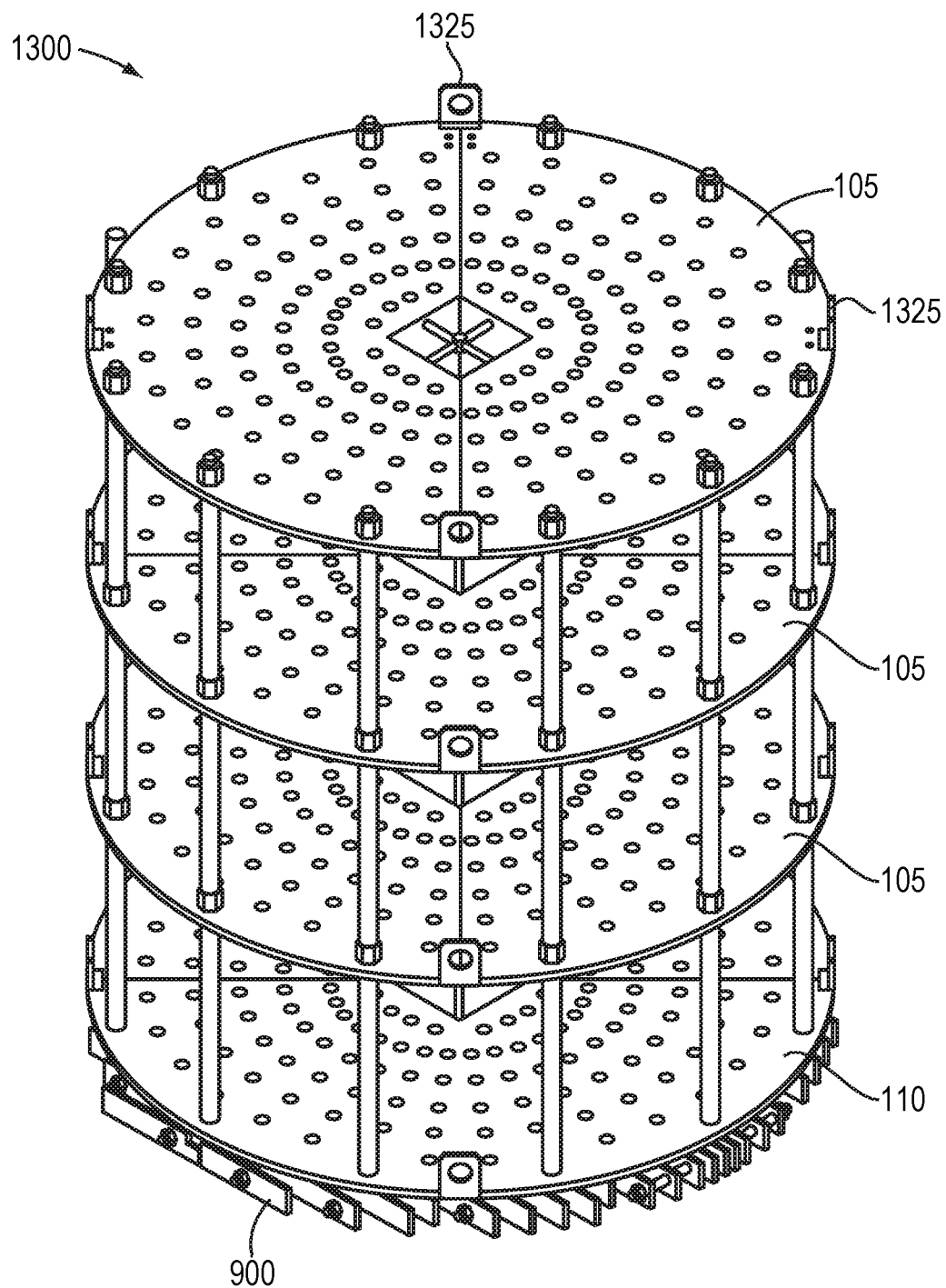
FIG. 13A is a perspective view of an assembled rack in accordance with various embodiments of the invention.
Figure 13B:
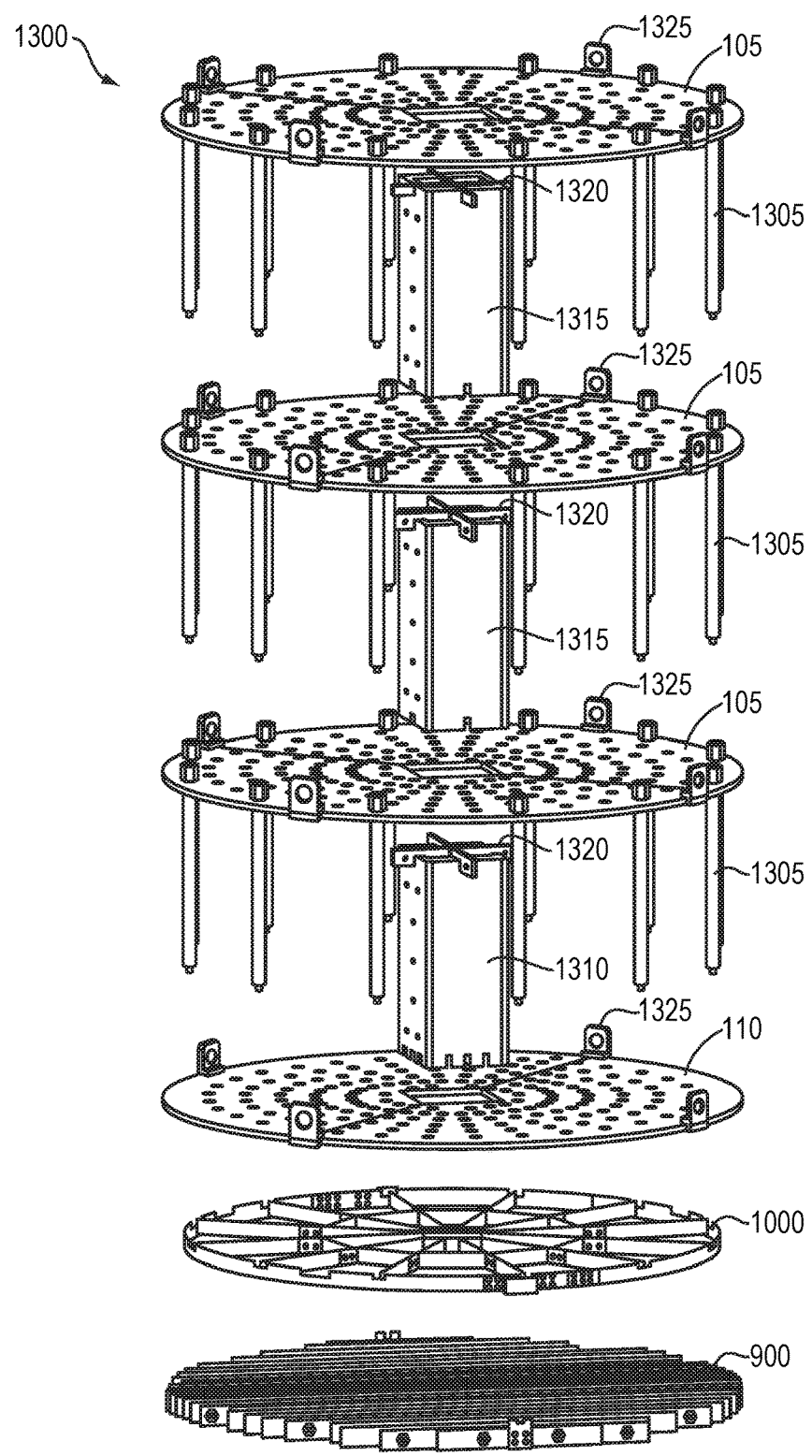
FIG. 13B is an exploded perspective view of the rack of FIG. 13A.

FIGS. 13A and 13B depict an exemplary rack 1300 in accordance with various embodiments of the invention. As shown, the rack 1300 includes shelves 105, 110, a base 900, and a shelf support 1000. The rack 1300 also includes a series of support rods 1305 between each pair of shelves, as well as a support tube 1310 or 1315 and a support bracket 1320 between each pair of shelves. The shelves of rack 1300 (or rack 100) may also incorporate one or more lift hooks 1325 that enable the modularized movement or removal of a "modular unit" of rack 1300 that may include or consist essentially of a single shelf and all of the support rods 1305 connected thereto (e.g., extending downward therefrom). FIG. 13C depicts one such modular unit of rack 1300, and FIG. 13D depicts a section of FIG. 13C along the line denoted as E-E.

FIG. 13E, corresponding to the circled area F in FIG. 13D, is an enlarged view of an exemplary connection between a support rod 1305 and a shelf 105. As shown, an upper end of support rod 1305 extends through an aperture defined in shelf 105, defines a shoulder 1330 to help support the weight of the shelf 105 (and any workpieces thereon), and ends in a threaded end 1335. The support rod 1305 may be held in place via attachment of a nut 1340 having threads complementary to those of threaded end 1335. The nut 1340 may also define within its top surface a recess 1345, which may be tapered, for receiving the bottom end of a support rod 1305 connected to a shelf 105 thereabove. FIG. 13F, corresponding to circled area G in FIG. 13D, depicts an end 1350 of support rod 1305 that may be sized and shaped (e.g., tapered) to fit snugly within the recess 1345 of a nut 1340 disposed below the rod 1305. As shown in FIGS. 13A and 13B, the ends 1350 of support rods may simply fit within apertures (which may themselves be tapered) within the bottommost shelf 110 of rack 1300.

Figure 13G:
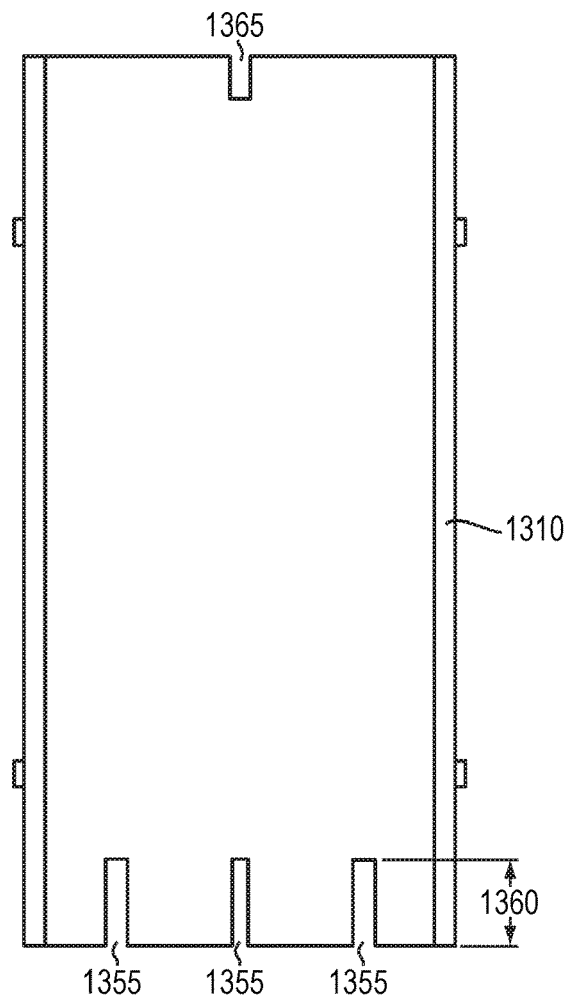
FIG. 13G is a side view of a support tube in accordance with various embodiments of the invention.
Figure 13H:
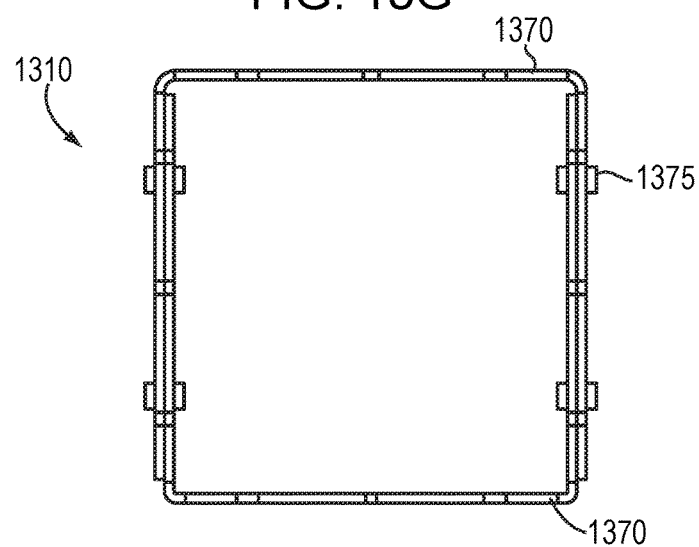
FIG. 13H is a top view of the support tube of FIG. 13G.

FIGS. 13G and 13H depict an exemplary support tube 1310 in accordance with various embodiments of the invention. As shown in FIG. 13B, the bottom portion of support tube 1310 extends through an aperture in shelf 110, and one or more recesses 1355 accommodate various ones of the cross braces 1205 of the shelf support 1000. Thus, a depth 1360 of recesses 1355 may be approximately equal to or greater than a height of such cross braces 1205. As shown in FIG. 13G, the top portion of support tube 1310 may define therewithin a set of recesses 1365 that accommodate at least a portion of the thickness of the support bracket 1320. In this manner, the support tube 1310 and support bracket 1320 help support the weight of the shelf 105 thereover (and any workpieces thereon). As shown in FIG. 13H, the support tube 1310 may include or consist essentially of two interfitting U-channel beams 1370 fastened together by, e.g., one or more rivets 1375. In other embodiments, the support tube 1310 may be composed of a single cylindrical part. In various embodiments, support tube 1310 may have a cross-sectional shape that is substantially the same as that of the large apertures within the shelves 105, 110 through which the support tubes partially extend. For example, the support tube may have a substantially square cross-sectional shape, as shown in FIG. 13H, or the cross-sectional shape may be rectangular, circular, etc.

Figure 13I:
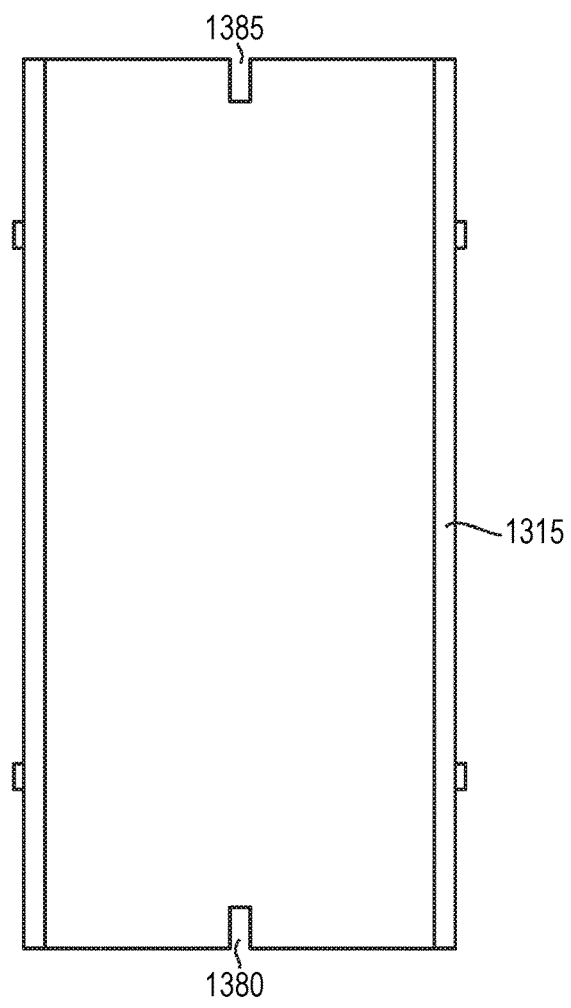
FIG. 13I is a side view of a support tube in accordance with various embodiments of the invention.
Figure 13J:
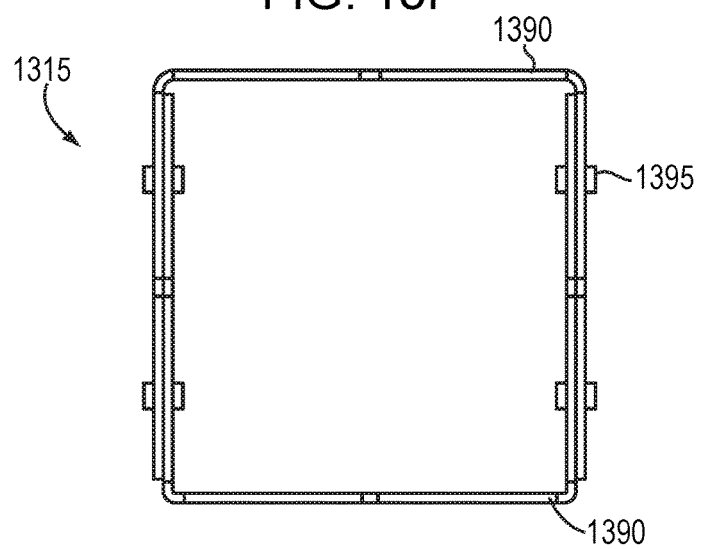
FIG. 13J is a top view of the support tube of FIG. 13I.

FIGS. 13I and 13J depict an exemplary support tube 1315 in accordance with various embodiments of the invention. As shown in FIG. 13B, the bottom portion of support tube 1315 extends through an aperture in a shelf 105, and one or more recesses 1380 accommodate at least a portion of the support bracket 1320 disposed below that shelf 105. As shown in FIG. 13I, the top portion of support tube 1315 may define therewithin a set of recesses 1385 that accommodate at least a portion of the thickness of a support bracket 1320. In this manner, the support tube 1315 and support bracket 1320 help support the weight of the shelf 105 thereover (and any workpieces thereon). As shown in FIG. 13J, the support tube 1315 may include or consist essentially of two interfitting U-channel beams 1390 fastened together by, e.g., one or more rivets 1395. In other embodiments, the support tube 1315 may be composed of a single cylindrical part. In various embodiments, support tube 1315 may have a cross-sectional shape that is substantially the same as that of the large apertures within the shelves 105 through which the support tubes partially extend. For example, the support tube may have a substantially square cross-sectional shape, as shown in FIG. 13J, or the cross-sectional shape may be rectangular, circular, etc.

Figure 13K:
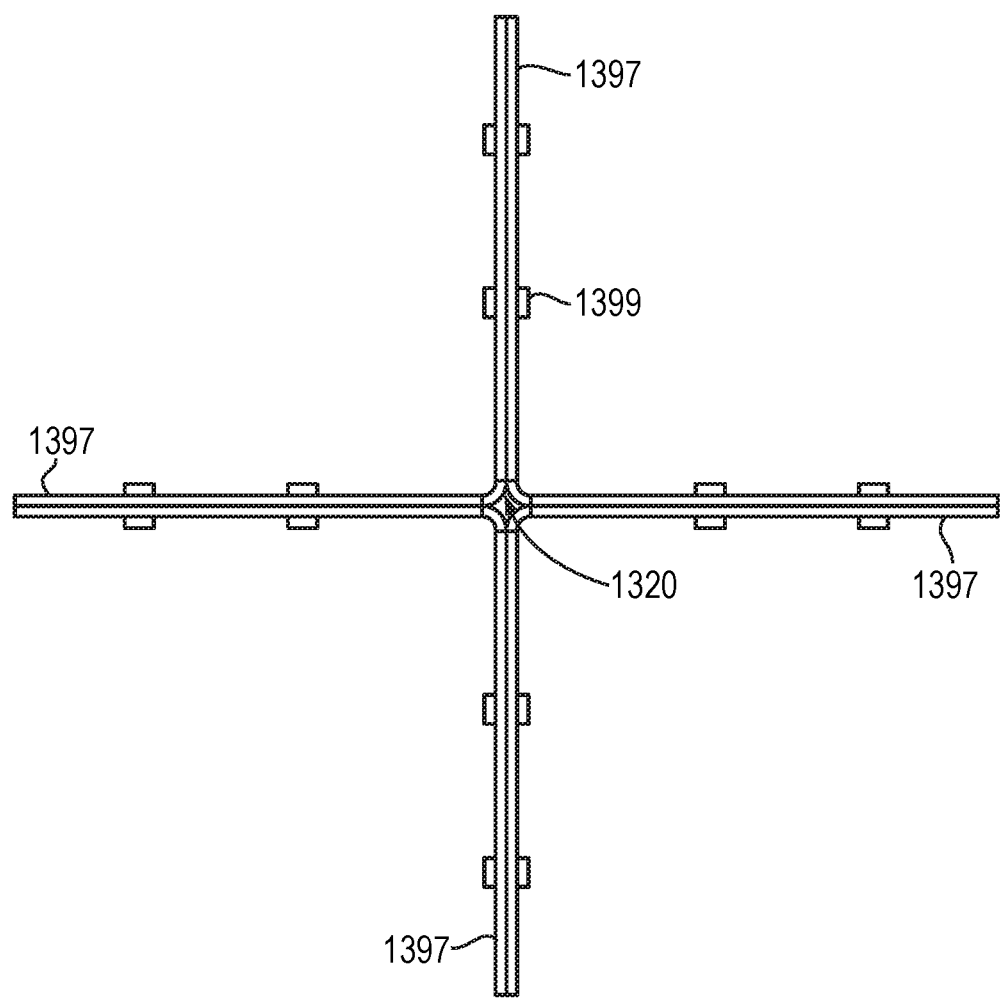
FIG. 13K is a plan view of a support bracket in accordance with various embodiments of the invention.

FIG. 13K depicts an exemplary support bracket 1320 in accordance with various embodiments of the present invention. As shown, the support bracket 1320 may include or consist essentially of multiple angle brackets 1397 fastened together with, e.g., one or more rivets 1399, that collectively form a cross shape. In other embodiments, the support bracket 1320 may be composed of a single part having the desired shape.

In various embodiments, one or more of the components of rack 1300 (e.g., shelves 105, 110, base 900, shelf support 1000, rods 1305, support tubes 1310, 1315, support brackets 1320, lift hooks 1325, nuts 1340, and/or rivets 1375, 1395, 1399) include, consist essentially of, or consist of one or more TZM alloys. In other embodiments, one or more of the components of rack 1300 include, consist essentially of, or consist of one or more refractory metals, e.g., Nb, Ta, Re, W, and/or Mo. In various embodiments, one or more of the components of rack 1300 incorporate one or more alloying elements, for example La, at concentrations of, e.g., approximately 0.01% to approximately 1%.

As mentioned above, racks 100, 1300 in accordance with embodiments of the present invention may be utilized to receive and support parts (or "components") during high-temperature processes such as brazing. For example, multiple heavy metallic parts may be placed on each shelf 105, 110 with a brazing material placed at locations between the parts where brazed joints are desired. For example, a first component including, consisting essentially of, or consisting of steel (e.g., stainless steel) may be joined to a second component including, consisting essentially of, or consisting of Ti with a brazing material including, consisting essentially of, or consisting of, for example, silver or an alloy of nickel and chromium. The rack 100, 1300 may be disposed within a furnace chamber configured to heat the parts and the rack 100, 1300 to elevated processing temperatures of greater than 1000° C., e.g., between approximately 1100° C. and approximately 1500° C. or even approximately 2000° C. with appropriate refractory metal selection. The furnace chamber may be sealable to enable the evacuation thereof for processing parts under vacuum (for example, to prevent exposure to oxygen at high temperatures and resulting deleterious oxidation) or for the introduction of one or more process gases, e.g., hydrogen gas if a reducing atmosphere is desired. The parts are heated within the furnace chamber at the desired processing temperature and under the desired ambient conditions until the brazing material melts and forms the brazed joint(s) between the parts. The parts may then be cooled down and removed from the rack 100, 1300 and the furnace chamber for further processing. The design features of rack 100, 1300 described herein advantageously enable the high-temperature batch processing of multiple joined parts and repeated use without deformation or failure of rack 100, 1300.

Figure 14:
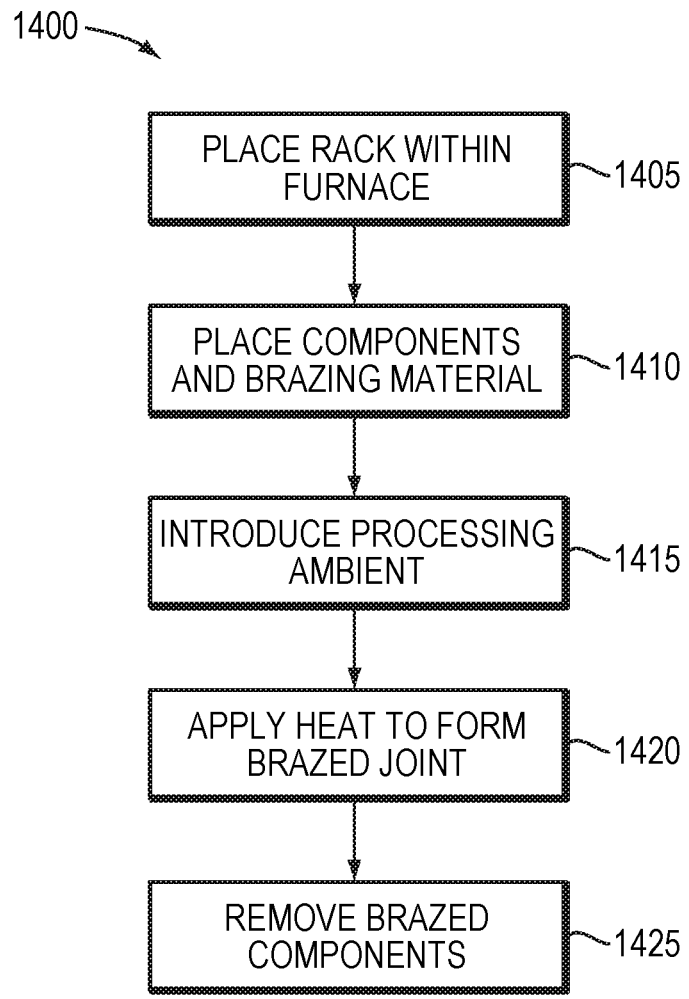
FIG. 14 is a flowchart of an exemplary process in accordance with various embodiments of the invention.

Thus, as shown in FIG. 14, embodiments of the invention include a high-temperature brazing process 1400. In a step 1405, a rack 100 and/or a rack 1300 may be disposed within a furnace chamber. In a step 1410, multiple components to be brazed together may be placed on one or more of the shelves of the rack, and brazing material is disposed between components in locations where it is desired to join components via brazed joints. The components may each include, consist essentially of, or consist of, for example, steel and/or Ti. The brazing material may include, consist essentially of, or consist of, for example, silver, nickel, and/or chromium. In a step 1415, a processing ambient may be introduced within the furnace chamber. The processing ambient may include, consist essentially of, or consist of, for example, vacuum, one or more inert gases (e.g., argon), nitrogen, and/or hydrogen. The processing ambient may be substantially free of oxygen to prevent oxidation of the brazed joint. In a step 1420, the furnace chamber may be heated to a process temperature, e.g., a temperature exceeding approximately 1000° C., thereby melting the brazing material. The brazing material thus forms joints between various ones of the components. In a step 1425, the temperature within the furnace chamber is reduced, and the brazed parts are removed from the rack and the furnace chamber. In various embodiments of the invention, various steps of process 1400 may be omitted or performed in a different order than that presented in FIG. 14.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An apparatus for receiving and supporting one or more components during processing thereof at a process temperature greater than approximately 1000° C., the apparatus comprising:

a first shelf (i) comprising a first refractory metal having a melting point greater than the process temperature and (ii) defining therethrough a plurality of apertures, each aperture being threaded through at least a portion of its thickness;
a plurality of first support posts, each first support post (i) comprising a second refractory metal having a melting point greater than the process temperature, (ii) having a threaded lower end for engagement with a threaded aperture of the first shelf, and (iii) defining a support collar proximate an upper end opposite the threaded lower end, a lateral dimension of the first support post above the support collar being smaller than a lateral dimension of the first support post below the support collar;
a second shelf (i) comprising a third refractory metal having a melting point greater than the process temperature and (ii) defining therethrough a plurality of apertures, each aperture of the second shelf being configured to receive the upper end of one of the first support posts such that a portion of the second shelf proximate each aperture thereof rests upon the support collar of the first support post received in the aperture,
a third shelf (i) comprising a fourth refractory metal having a melting point greater than the process temperature and (ii) defining therethrough a plurality of apertures; and
a plurality of second support posts, each second support post (i) comprising a fifth refractory metal having a melting point greater than the process temperature, (ii) having a threaded lower end for engagement with a threaded aperture, (iii) defining a support collar proximate an upper end opposite the threaded lower end, a lateral dimension of each second support post above the support collar being smaller than a lateral dimension of each second support post below the support collar, and (iv) defining a dowel pin mount through the upper end thereof above the support collar,
wherein (A) the upper end of each second support post is receivable within an aperture of the third shelf such that (i) a portion of the third shelf proximate each aperture thereof rests upon the support collar of the second support post received in the aperture, and (ii) the dowel pin mount of each second support post is disposed above a top surface of the third shelf, (B) each of the apertures of the second shelf is threaded through at least a portion of its thickness, and (C) the threaded lower end of each second support post is receivable within one of the threaded apertures in the second shelf.

2. The apparatus of claim 1, wherein at least one of the first, second, third, fourth, or fifth refractory metals comprises a TZM alloy.

3. The apparatus of claim 1, wherein at least one of the first, second, third, fourth, or fifth refractory metals comprises at least one of Nb, Ta, Re, W, or Mo.

4. The apparatus of claim 1, wherein the threaded lower end of each of the first support posts defines a support shoulder above threads of the threaded lower end, a lateral dimension of each first support post above the support shoulder being larger than a lateral dimension of the threaded lower end thereof.

5. The apparatus of claim 1, wherein the threaded lower end of each of the second support posts defines a support shoulder above threads of the threaded lower end, a lateral dimension of each second support post above the support shoulder being larger than a lateral dimension of the threaded lower end thereof.

6. The apparatus of claim 1, further comprising a plurality of locking pins, each locking pin (i) comprising a sixth refractory metal having a melting point greater than the process temperature and (ii) being receivable within the dowel pin mount of one of the second support posts, thereby preventing disengagement of the second support posts from the third shelf.

7. The apparatus of claim 6, wherein each locking pin defines one or more apertures therethrough.

8. The apparatus of claim 7, further comprising a plurality of retaining wires, each retaining wire (i) comprising a seventh refractory metal having a melting point greater than the process temperature and (ii) being receivable within an aperture of a locking pin, thereby preventing disengagement of the locking pin from the second support post in which it is received.

9. The apparatus of claim 1, wherein the first shelf defines a central aperture therethrough, the apparatus further comprising:
disposed below the first shelf, a shelf support comprising a plurality of interconnected cross braces, each cross brace comprising a fourth refractory metal having a melting point greater than the process temperature; and
a first support tube (i) having a lower end for extending through the central aperture of the first shelf and defining a plurality of notches, each notch configured to receive therein one of the cross braces of the shelf support, and (ii) comprising a fifth refractory metal having a melting point greater than the process temperature.

10. The apparatus of claim 9, wherein the first support tube has an upper end opposite the lower end, the upper end defining therein a plurality of notches, the apparatus further comprising a first support brace comprising a plurality of appendages for supporting the second shelf thereon, each appendage being configured for receipt into one of the notches of the upper end of the first support tube.

11. The apparatus of claim 10, wherein the appendages of the support brace define a cross shape.

12. The apparatus of claim 10, wherein the second shelf defines a central aperture therethrough, the apparatus further comprising a second support tube (i) having a lower end for extending through the central aperture of the second shelf and defining a plurality of notches, each notch configured to receive therein one of the appendages of the support brace, and (ii) comprising a sixth refractory metal having a melting point greater than the process temperature.

13. The apparatus of claim 12, wherein the second support tube has an upper end opposite the lower end, the upper end defining therein a plurality of notches.

14. The apparatus of claim 9, further comprising, disposed beneath the shelf support, a base comprising (i) a plurality of spaced-apart cross bars each defining a plurality of apertures therethrough, and (ii) a plurality of spaced-apart through rods each extending through the apertures of multiple ones of the cross bars.

15. The apparatus of claim 14, wherein:
the base comprises one or more alignment features extending upward therefrom; and
the shelf support comprises one or more brackets each for receiving one of the one or more alignment features.

16. The apparatus of claim 1, further comprising, disposed beneath the first shelf, a base comprising (i) a plurality of spaced-apart cross bars each (a) defining a plurality of apertures therethrough and (b) comprising a fourth refractory metal having a melting point greater than the process temperature, and (ii) a plurality of spaced-apart through rods each (a) extending through the apertures of multiple ones of the cross bars and (b) comprising a fifth refractory metal having a melting point greater than the process temperature.

17. The apparatus of claim 16, further comprising, disposed below the first shelf and above the base, a shelf support comprising a plurality of interconnected cross braces, each cross brace comprising a sixth refractory metal having a melting point greater than the process temperature.

18. The apparatus of claim 17, wherein:
the base comprises one or more alignment features extending upward therefrom; and
the shelf support comprises one or more brackets each for receiving one of the one or more alignment features.

19. A method of high-temperature brazing at a process temperature greater than approximately 1000° C., the method comprising:
disposing within a furnace chamber an apparatus comprising:
a first shelf (i) comprising a first refractory metal having a melting point greater than the process temperature and (ii) defining therethrough a plurality of apertures, each aperture being threaded through at least a portion of its thickness,
a plurality of first support posts, each first support post (i) comprising a second refractory metal having a melting point greater than the process temperature, (ii) having a threaded lower end for engagement with a threaded aperture of the first shelf, and (iii) defining a support collar proximate an upper end opposite the threaded lower end, a lateral dimension of the first support post above the support collar being smaller than a lateral dimension of the first support post below the support collar,
a second shelf (i) comprising a third refractory metal having a melting point greater than the process temperature and (ii) defining therethrough a plurality of apertures, each aperture of the second shelf receiving the upper end of one of the first support posts such that a portion of the second shelf proximate each aperture thereof rests upon the support collar of the first support post received in the aperture,
a third shelf (i) comprising a fourth refractory metal having a melting point greater than the process temperature and (ii) defining therethrough a plurality of apertures, and
a plurality of second support posts, each second support post (i) comprising a fifth refractory metal having a melting point greater than the process temperature, (ii) having a threaded lower end for engagement with a threaded aperture, (iii) defining a support collar proximate an upper end opposite the threaded lower end, a lateral dimension of each second support post above the support collar being smaller than a lateral dimension of each second support post below the support collar, and (iv) defining a dowel pin mount through the upper end thereof above the support collar,
wherein (A) the upper end of each second support post is received within an aperture of the third shelf such that (i) a portion of the third shelf proximate each aperture thereof rests upon the support collar of the second support post received in the aperture, and (ii) the dowel pin mount of each second support post is disposed above a top surface of the third shelf, and (B) the threaded lower end of each second support post is received within a threaded aperture in the second shelf;
disposing on the first shelf or the second shelf or the third shelf of the apparatus (i) a first component, (ii) a second component, and (iii) a brazing material disposed between the first and second components;
introducing within the furnace chamber a processing ambient; and
applying the process temperature within the furnace chamber, thereby melting the brazing material and joining the first and second components at a brazed joint therebetween.

20. The method of claim 19, wherein introducing the processing ambient comprises at least partially evacuating the furnace chamber.

21. The method of claim 19, wherein introducing the processing ambient comprises introducing a process gas within the furnace chamber.

22. The method of claim 21, wherein the process gas comprises hydrogen.

23. The apparatus of claim 1, wherein each of the apertures defined through the third shelf is unthreaded.

24. The apparatus of claim 1, wherein each of the dowel pin mounts is unthreaded.

25. The apparatus of claim 1, wherein each aperture of the first shelf extends through an entirety of a thickness of the first shelf.

26. The apparatus of claim 1, wherein each of the dowel pin mounts extends through a central axis of the upper end of the second support post in which it is defined.

* * * * *